(12) United States Patent
Goehring et al.

(10) Patent No.: US 12,107,924 B1
(45) Date of Patent: *Oct. 1, 2024

(54) TECHNIQUES FOR PROVIDING NETWORK APPLICATIONS

(71) Applicant: Amazon Technologies, Inc., Seattle, WA (US)

(72) Inventors: David Guadalupe Goehring, Riverside, CA (US); Kevin Munns, Aliso Viejo, CA (US); Mustafa Hakim, Tustin, CA (US); Samuel Adam Salameh, Rancho Santa Margari, CA (US); Jocelyn Hotte, Burien, WA (US); Paul-Michel Deblois, Kirkland, WA (US); Arun Param, Coto de Caza, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,200

(22) Filed: Nov. 20, 2023

Related U.S. Application Data

(63) Continuation of application No. 17/167,320, filed on Feb. 4, 2021, now Pat. No. 11,824,940.

(51) Int. Cl.
 *H04L 67/131* (2022.01)
 *A63F 13/31* (2014.01)
 (Continued)

(52) U.S. Cl.
 CPC ............ *H04L 67/131* (2022.05); *A63F 13/31* (2014.09); *A63F 13/323* (2014.09); *A63F 13/48* (2014.09);
 (Continued)

(58) Field of Classification Search
 CPC ........ H04L 67/131; H04L 67/14; A63F 13/31; A63F 13/323; A63F 13/48; A63F 13/79;
 (Continued)

(56) References Cited

U.S. PATENT DOCUMENTS 11,249,740 B1    2/2022  Kennedy et al.
2009/0234955 A1* 9/2009  Hanley ............ H04N 21/23116
                                                  709/228

(Continued)

OTHER PUBLICATIONS

Office Action for U.S. Appl. No. 17/167,320, mailed May 27, 2022, Goehring, "Techniques for Providing Network Applications", 16 pages.

(Continued)

*Primary Examiner* — Brian J. Gillis
*Assistant Examiner* — Chhian (Amy) Ling
(74) *Attorney, Agent, or Firm* — Lee & Hayes, P.C.

(57) ABSTRACT

This disclosure describes, in part, methods and techniques for providing network applications. For instance, remote system(s) may generate a link that provides access to a network application. After generating the link, the remote system(s) may provide the link to a device of a source, such as a user, a developer, or a third-party service. The source may then use the device to share the link with a user. For example, the source may use the device to send a message that includes the link, post the link on a website, or share the link using a social media platform. The user may then use a device to view and select the link. Based on selecting the link, the remote system(s) may perform one or more actions. For example, the remote system(s) may create a session for the network application and provide the device with data to connect to the session.

20 Claims, 17 Drawing Sheets

(51) Int. Cl.
  *A63F 13/323* (2014.01)
  *A63F 13/48* (2014.01)
  *A63F 13/79* (2014.01)
  *A63F 13/795* (2014.01)
  *A63F 13/87* (2014.01)
  *H04L 67/14* (2022.01)

(52) U.S. Cl.
  CPC ............ *A63F 13/79* (2014.09); *A63F 13/795* (2014.09); *A63F 13/87* (2014.09); *H04L 67/14* (2013.01); *A63F 2300/538* (2013.01)

(58) Field of Classification Search
  CPC ... A63F 13/795; A63F 13/87; A63F 2300/538
  See application file for complete search history.

(56) References Cited

U.S. PATENT DOCUMENTS

| | | |
|---|---|---|
| 2012/0178536 A1 | 7/2012 | Oh et al. |
| 2013/0090170 A1 | 4/2013 | Reed |
| 2013/0332470 A1 | 12/2013 | Saito |
| 2014/0349758 A1 | 11/2014 | Kimura et al. |
| 2017/0333789 A1 | 11/2017 | Shepard et al. |
| 2018/0250591 A1 | 9/2018 | Prado Rojas et al. |
| 2019/0081944 A1 | 3/2019 | Wasiq et al. |
| 2019/0321732 A1 | 10/2019 | Zimring et al. |
| 2019/0329134 A1 | 10/2019 | Shriram et al. |
| 2020/0001177 A1 | 1/2020 | Champy |

OTHER PUBLICATIONS

Office Action for U.S. Appl. No. 17/167,320, mailed on Feb. 3, 2023, Goehring, "Techniques for Providing Network Applications", 25 pages.

Office Action for U.S. Appl. No. 17/167,320, mailed on Dec. 30, 2021, Goehring, "Techniques for Providing Network Applications", 16 pages.

Office Action for U.S. Appl. No. 17/167,320, mailed on Sep. 16, 2022, Goehring, "Techniques for Providing Network Applications", 21 pages.

* cited by examiner

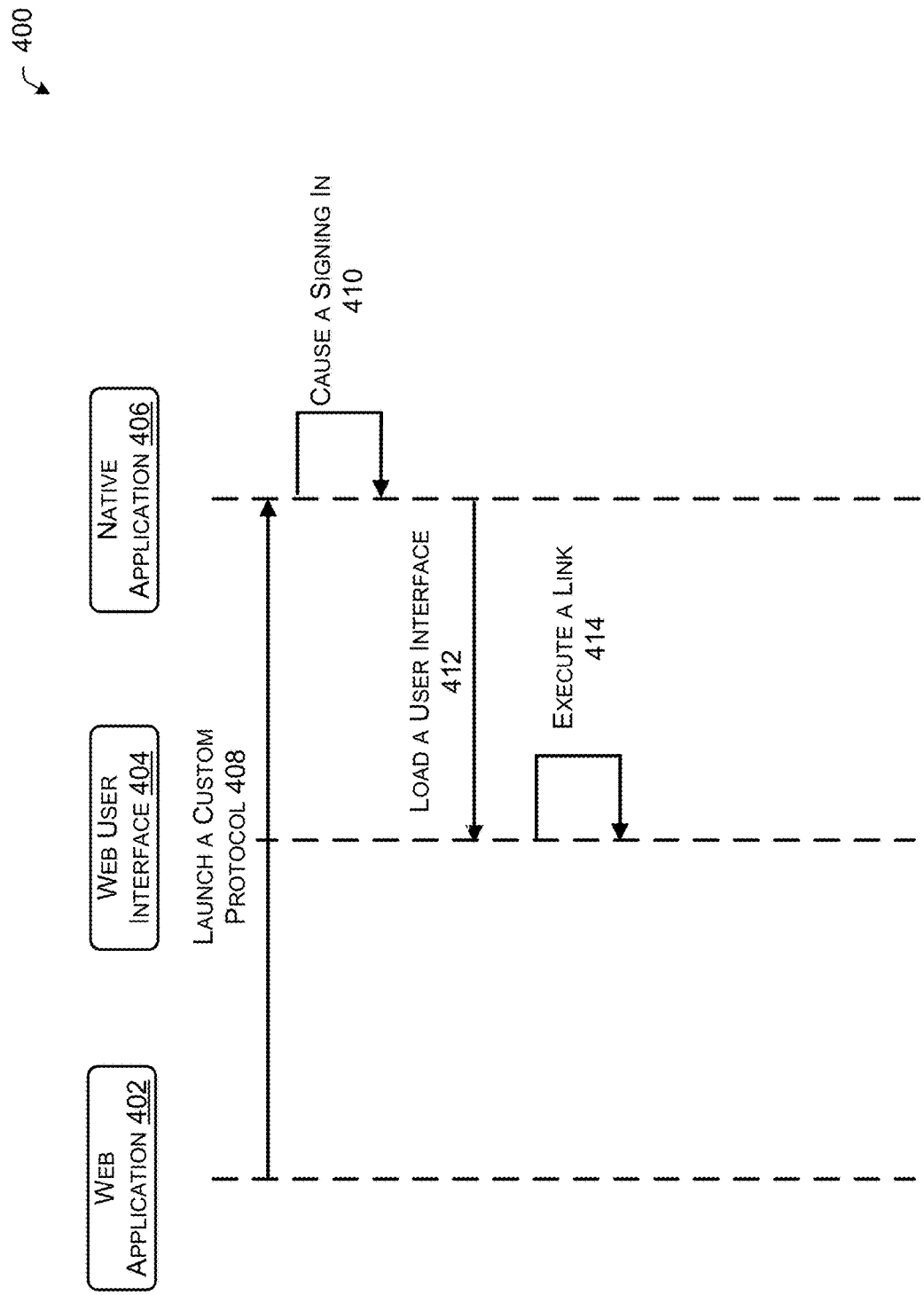

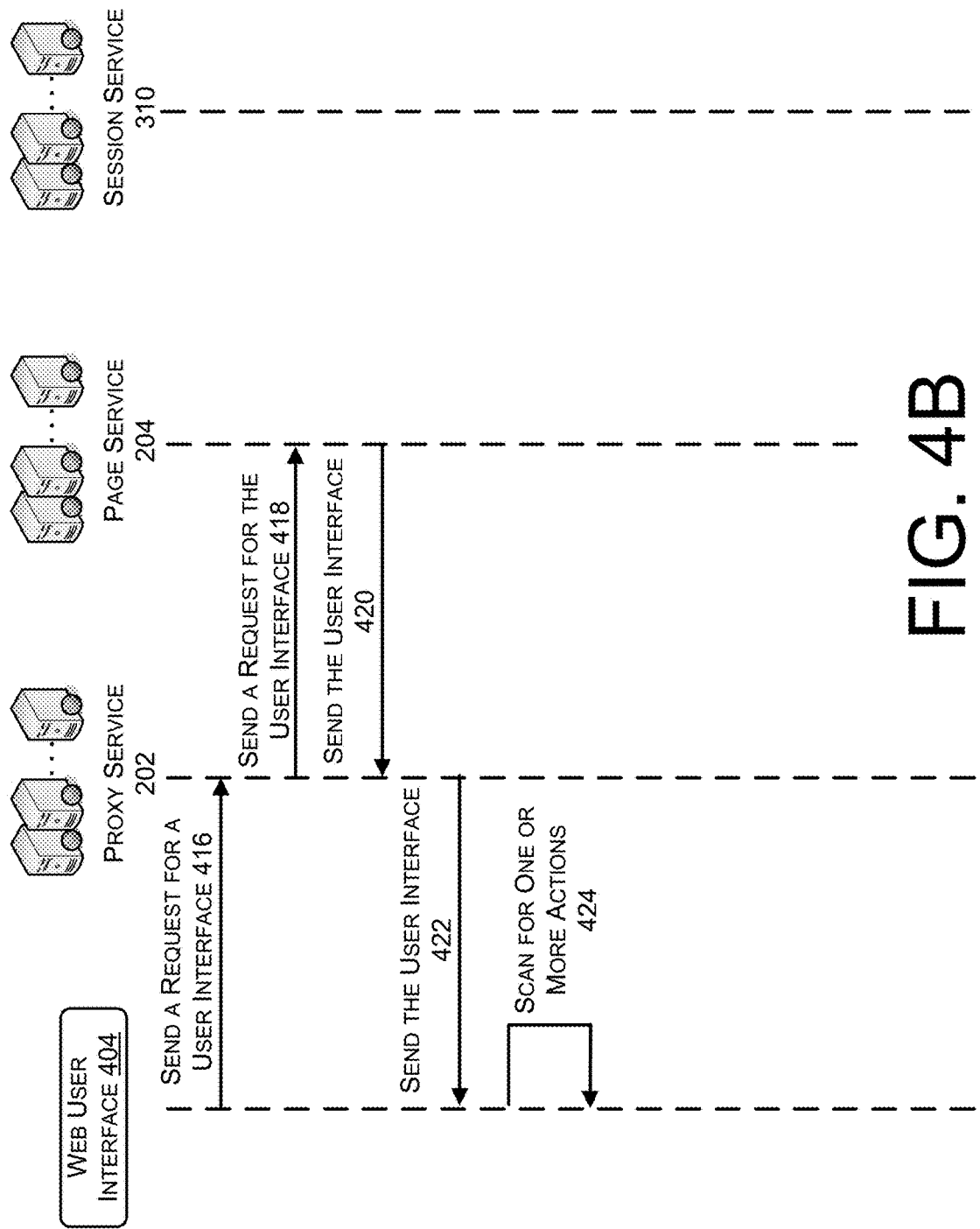

TECHNIQUES FOR PROVIDING NETWORK APPLICATIONS

RELATED APPLICATION

This application is a continuation of and claims priority to U.S. patent application Ser. No. 17/167,320, now U.S. Pat. No. 11,824,940, Feb. 4, 2021, titled "TECHNIQUES FOR PROVIDING NETWORK APPLICATIONS," the entirety of which is incorporated herein by reference.

BACKGROUND

As gaming has become popular, companies have created new techniques, such as network accessible systems, that allow users to play various types of games. For example, a system, which may be wirelessly connected to a television via network(s), may cause the television to display content related to a state of a game. While the television is displaying the content, the system may receive, via the network(s), inputs from a video game controller and update, using the inputs, the state of the game being displayed by the television. Since network gaming is new to many users, such users may find it difficult to create accounts, identify new games, and/or determine how to access the games.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4A-4C illustrate an example process for creating a session for a network application based on a selection of a link, in accordance with examples of the present disclosure.

DETAILED DESCRIPTION

Figure 1A:
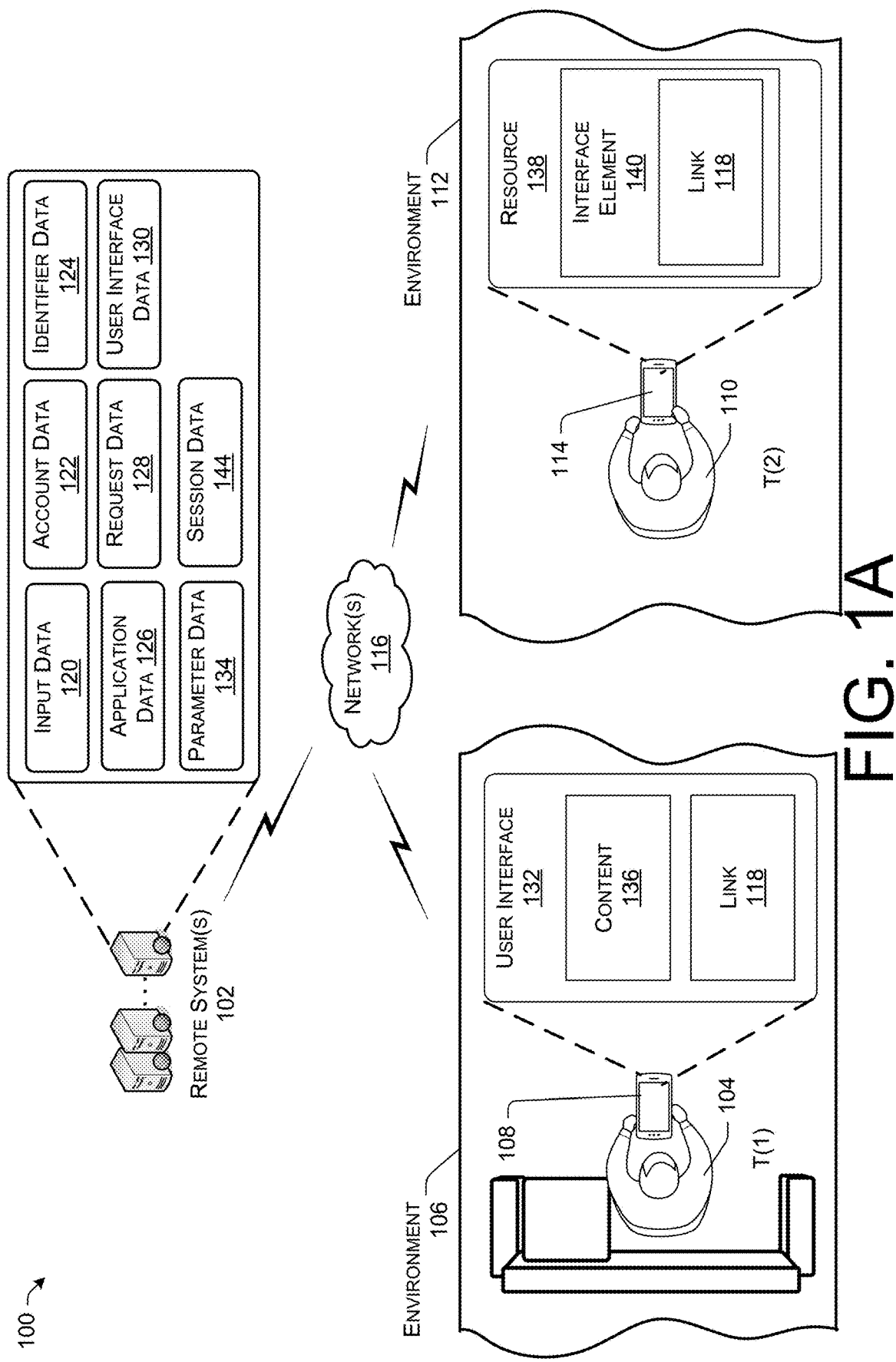
FIGS. 1A-1B illustrate a schematic diagram of an example system for providing a link that is associated with a network application, in accordance with examples of the present disclosure.

This disclosure describes, in part, systems and techniques for providing network applications to users. For instance, a source, such as a user, a developer, and/or a third-party service, may want to share the network application with other users. To share the network application, system(s) may generate a link for accessing the network application. For example, if the network application includes a network game, the link may include a "deep" link that allows other users to automatically connect to a session of the network game. The system(s) may then provide the source with a user interface that includes content related to the network application and the link. Using the user interface, the source may share the link with other users using one or more resources, such as messages, websites, social media platforms, and/or the like. Another user may then use an electronic device to view a resource and provide input selecting the link. In response to the input, the system(s) may provide access to the network application. For example, and again if the network application includes a network game, the system(s) may automatically create a new session of the network game and send the electronic device data for connecting to the session.

For more detail, the system(s) may initially generate the link for the network application. In the examples above, the link may include, but is not limited to, a Universal Resource Locator (URL), a Universal Resource Identifier (URI), a "deep" link, and/or any other type of link that provides access to a resource associated with the network application (referred to, in some examples, as an "application resource"). The application resource may include, but is not limited to, a session of the network application, a user interface that provides information about the network application (e.g., a details page), a user interface for creating an account associated with the network application, a user interface for acquiring the network application, and/or the like. In some examples, the link may provide direct access to the resource. In other examples, the link may provide direct access to another resource, where a service (e.g., the system(s)) then perform redirection to the application resource.

In some examples, the system(s) generate the link using text representing one or more parameters associated with the network application. The one or more parameters may include, but are not limited to, an identifier associated with a distributer of the network application, an identifier associated with the network application, an identifier associated with a developer of the network application, an indication of the product stage associated with the network application (e.g., alpha stage, production stage, etc.), an indicator of a target client type (e.g., browser, native application, etc.), an indication to redirect to a specific target client type, and/or one or more other parameters. As described herein, an identifier may include, but is not limited to, a name, a username, a alphabetic identifier, a numerical identifier, a mixed alphabetic and numerical identifier, and/or any other type of identifier that may be used to identify a distributor, a developer, a network application, a user, an account, and/or the like.

Additionally, or alternatively, in some examples, the system(s) generate the link to perform one or more actions, which are described in more detail below. For a first example, such as when the network application includes a network game, the system(s) may generate the link such that the link causes a launching of the network game (e.g., causes an electronic device to connect to a created session for the network game). For a second example, the system(s) may generate the link such that the link causes a loading of a user interface, such as a details page. In some examples, the system(s) cause the one or more actions based on the text of the link. For example, a link that includes text "/play" may include the launching of the network game while a link that includes the text "/detail" may include the loading of the user interface. While these are just couple examples of text that may cause one or more actions, in other examples, the link may include additional and/or alternative text that cause additional and/or alternative actions.

To provide the link, and in examples where the source includes a first user requesting the link, the system(s) may receive data from a first electronic device associated with the first user. The data may include, but is not limited to, credentials associated with a user account, an identifier associated with the network application, a request for a user interface that includes information about the network application, a request for the link, and/or the like. Using the data, the system(s) may identify the user account of the first user. For example, the system(s) may match the credential represented by the data to additional credential that are stored in association with the user account. In some examples, the system(s) may also determine, using the user account, that the first user is authorized to access the network application. For example, the system(s) may determine that the first user is associated with the user account and/or that the first user has acquired the network application (e.g., received free access to the network application, rented the network application, purchased the network application, subscribed to a service that provides the network applications, etc.).

The system(s) may then generate the user interface that includes the link. In some examples, the user interface may include a details page that includes content related to the network application and an interface element for viewing and/or copying the link. As described herein, content may include, but is not limited to, videos, graphics, information, interface elements, advertisements, and/or any other type of content that may be included on a user interface. Additionally, an interface element may include, but is not limited to, a button, a text field, a graphic, a code (e.g., Quick Response code), and/or any other interactive content that may be included on a user interface. In some examples, the system(s) generate the user interface and/or the link using a page service.

The first user may then share the link with one or more other users. For a first example, the first user may share the link by using the first electronic device to send, to second electronic device associated with a second user, a message that includes the link. The message may include, but is not limited to, an email message, a text message, a social networking message, and/or any other type of message. For a second example, the first user may share the link by using the first electronic device to post the link on a social media platform. Still, for a third example, the first user may share the link by using the first electronic device to post the link to another type of website. While these are just a couple example techniques of how the first user may share the link with one or more other users, in other examples, the first user may use one or more additional and/or alternative techniques for sharing the link.

While the examples above describe the system(s) generating the link for the first user, in other examples, the system(s) may generate a link for another type of source, such as a developer. For example, the system(s) may receive data from a third electronic device associated with the developer. The data may include, but is not limited to, binary associated with the network application, one or more of the parameters described above, a request to generate the link, and/or the like. In some examples, the system(s) initially send, to the third electronic device, data representing a user interface that the developer may use to input the information represented by the data. The system(s) may then use the data from the third electronic device to generate the link for the developer. In some examples, the system(s) generate the link using a developer service. The system(s) may then send, to the third electronic device, data representing the link and/or an interface element associated with the link. Additionally, the developer may share the link using one or more of the techniques described above with respect to the first user.

Still, in some examples, the system(s) may provide a link to another type of source, such a third-party service (e.g., a social networking platform), where the third-party service then shares the link with users of the third-party service. For instance, the third-party service may provide the link using one or more resources (e.g., homepages, detail pages, etc.) provided by the third-party service. In some examples, the third-party service may only provide links for network applications that are active. In such examples, the system(s) may send, to the third-party service, data representing network applications that are currently active. For instance, the data may indicate which network applications are included in a catalog of network applications, where the catalog of network application indicates network applications that are active. Additionally, the system(s) may update the data each time a new network application is activated, each time a new application is deactivated, at given time intervals, in response to receiving a request, and/or at one or more additional and/or alternative times. Additionally, or alternatively, in some examples, the third-party service may only provide a link to users that are authorized to access the network application associated with the link. In such examples, the system(s) may send, to the third-party service, data representing users that are authorized to access the network application. Additionally, the system(s) may update the data each time a new user is authorized to access the network application, each time a user loses access to the network application, at given time intervals, in response to receiving a request, and/or at one or more additional and/or alternative times.

When providing a link using a third-party service, the link may associate an identifier associated with the distributor of the network application to an identifier associated with the third-party service. As such, in some examples, the system(s) may provide the third-party with a portion of the link and the third-party service may generate the rest of the link. For example, the portion of the link may identify the distributor while the rest of the link generated by the third-party service may identify the third-party service. In other examples, the system(s) may provide the third-party service with a template that the third-party service may use to generate the link.

Additionally, in the examples above, the source (e.g., the first user, the developer, the third-party service, etc.) may use one or more techniques for providing the link. For a first example, the source may provide the link by displaying the text of the actual link (e.g., provide the raw link). For a second example, the source may provide the link by embedding the link in additional content. For instance, the source may embed the link in an interface element, such as a button. The interface element may include content, such as text, associated with the link. For instance, the interface element may include text that says "Play Now" if the network application includes a network game. Still, for a third example, the resource that the source uses to provide the link may include additional content that is related to the network application.

After providing the link, the second user may use the second electronic device to receive and view the resource that includes the link. The second user may then use the link to access the application resource associated with the network application. For a first example, such as when the network application includes a network game, the second user may use the link to play the network game. For instance, based on the second user using the second electronic device to select the link, the system(s) may receive, from the second electronic device, data associated with the link. The data may include, but is not limited to, the one or more of the parameters described above (e.g., the identifier associated with the network game). In some instances, based on receiving the data, the system(s) may verify that the second user is authorized to access the network game, such as by using an account associated with the second user.

The system(s) may then create a session for the network application and send, to the second electronic device, data that the second electronic device may use to connect to the session. For example, the data may include, but is not limited to, an identifier associated with the session, a host address, and/or the like. Using the data, the second electronic device may then automatically connect to the session of the network game. In other words, the link may automatically cause the second electronic device to connect to the session without any further input from the second user.

For a second example, and again when the network application includes a network game, the second user may use the link to join a session that is already created and being used by one or more other users. For instance, the session may have previously been created for the first user, who is currently playing the network application using the session, and the link may cause the second user to join the same session. In such an example, the system(s) may send, to the second electronic device, data that the second electronic device may use to connect to the session. Again, the data may include, but is not limited to, an identifier associated with the session, a host address (e.g., a host Internet Protocol (IP) address), and/or the like.

For a third example, and again when the network application includes a network game, the second user may use the link to join a session that is associated with a particular point within the game. The particular point may include, but is not limited to, a level, a task, a period (such is in sports games), and/or the like. In such an example, the system(s) may send, to the second electronic device, data that the second electronic device may use to connect to the session. Again, the data may include, but is not limited to, an identifier associated with the session, a host address (e.g., a host Internet Protocol (IP) address), and/or the like. Additionally, the data may cause the second user to begin at the particular point within the network game.

For a fourth example, such as when the second user is not authorized to access the network application, the second user may use the link to access a user interface associated with the network application. For instance, based on the second user using the second electronic device to select the link, the system(s) may again receive the data from the electronic device. In some instances, the system(s) may then verify that the second user is not authorized to access the network application, such as by using the account associated with the second user. For example, the account may indicate that the second user has yet to acquire the network application. In response, the system(s) may generate the user interface that includes content related to the network application and/or an interface element for acquiring authorization to access the network application. The system(s) may then send, to the second electronic device, data representing the user interface. Based on receiving the data, the second electronic device may display the user interface so that the second user is able to acquire the authorization to access the network application.

For a fifth example, and again when the second user is not authorized to access the network application and the network application includes a network game, the second user may use the link to play the network game for a limited period of time (e.g., one minute, five minutes, ten minutes, thirty minutes, and/or any other period of time). For instance, the source may have the link created such that the link is only valid for the limited period of time, such as a trial period. In such an example, the system(s) may again create a session for the network application and send, to the second electronic device, data that the second electronic device may use to connect to the session. For example, the data may include, but is not limited to, an identifier associated with the session, a host address, and/or the like. Using the data, the second electronic device may then automatically connect to the session of the network game. Additionally, after the limited period of time has elapsed, the second electronic device may be disconnected from the session.

Still, for a sixth example, such as when the second user does not include an account associated with network applications, the second user may use the link to access a user interface associated with creating the account. For instance, based on the second user using the second electronic device to select the link, the system(s) may again receive the data from the electronic device. In some instances, the system(s) may then verify that the second user does not have the account associated with the network applications. In response, the system(s) may generate the user interface that the second user may use to create the account. The system(s) may then send, to the second electronic device, data representing the user interface. Based on receiving the data, the second electronic device may display the user interface so that the second user is able to create the account in order to access the network application.

In some examples, such as when the second user selects the link, the second electronic device (e.g., the operating system of the electronic device, the browser, etc.) may determine whether to user a browser or a native application associated with the network applications. For example, when the second electronic device receives the input from the user, the second electronic device may determine whether the native applications is downloaded and/or stored on the second electronic device. In instances where the second electronic device is downloaded and/or stored on the second electronic device, the second electronic device may then open the native application. In some examples, the second electronic device may automatically open the native application based on receiving the input selecting the link. In other examples, the second electronic device may initially display an inquiry to the second user asking whether to open the native application for accessing the network application. The second electronic device may then open the native application based on receiving an additional input requesting to open the native application.

Alternatively, in instances where the second electronic device has yet to download and/or store the native application, the second electronic device may either display an inquiry asking whether the second user wants to download the native application or the second electronic device may open a browser for accessing the network application. In some examples, the inquiry may include a message that is displayed to the second user while in other examples, the inquiry may correspond to an application store that allows the second user to download the native application. The second user is then able to determine whether to download the native application for accessing the network application or whether to use the browser to access the native application.

In some examples, the link may specify whether to use the native application or the browser when accessing the native application. For example, and as discussed above, one of the parameters associated with the link may indicate a specific target client type for accessing the network application. As such, the second electronic device may use the target client type associated with the link when accessing the network application. For a first example, if the electronic device has already downloaded and/or stored the native application, but the target client type associated with the link indicates the browser, then the second electronic device may still use the browser to access the network application. For a second example, and again if the electronic device has already downloaded and/or stored the native application, and the target client type associated with the link indicates the native application, then the second electronic device may still use the native application to access the network application.

Still, for a third example, if the electronic device has not already downloaded and/or stored the native application, but the target client type associated with the link indicates the native application, then the second electronic device may initially determine that the native application has not been downloaded and/or stored. The second electronic device may then either use the browser for accessing the network application and/or the second electronic device may display an inquiry asking whether the second user would like to download the native application.

The description about describes that the network application is provided by the system(s). For example, system(s) may send, to the second electronic device, data (e.g., video data, audio data, etc.) representing a first state of the network application. For example, if the network application includes a gaming application, the first state of the network application may include an object (e.g., a character) located at a first position within a gaming environment (e.g., a forest). The second electronic device may receive the data from the system(s) and, using the data, the second electronic device may display image(s) representing the first state of the network application. For example, and again if the network application includes the gaming application, the second electronic device may display content representing the object located at the first position within the gaming environment. In some instances, the second electronic device may further output sound represented by the audio data. The second user may then use a control device (e.g., a gaming controller) and/or the second electronic device to provide inputs to the network application via the system(s).

For example, the control device may receive an input, such as a selection of a button, joystick, key, touch-sensitive pad, sensor, and/or the like associated with the control device. The control device may then send, to the system(s), data representing the input. Using the data, the system(s) may update the first state of the application to a second state of the application. For example, and again if the network application includes the gaming application, the input may be associated with moving the object forward by a given amount within the gaming environment. As such, the system(s) may update the first state of the application to the second state of the application by moving the object forward in the environment by the given amount.

The system(s) may then send, to the second electronic device, data (e.g., video data, audio data, etc.) representing the second state of the application. Using the data, the second electronic device may display image(s) representing the second state of the game. For example, the second electronic device may display content representing the object located at the second position within the gaming environment. Additionally, in some instances, the second electronic device may output sound represented by the audio data. The system(s) may then continue to perform similar processes to update the state of the network application on the second electronic device as the system(s) continues to receive data from the control device and/or the second electronic device.

Figure 1B:
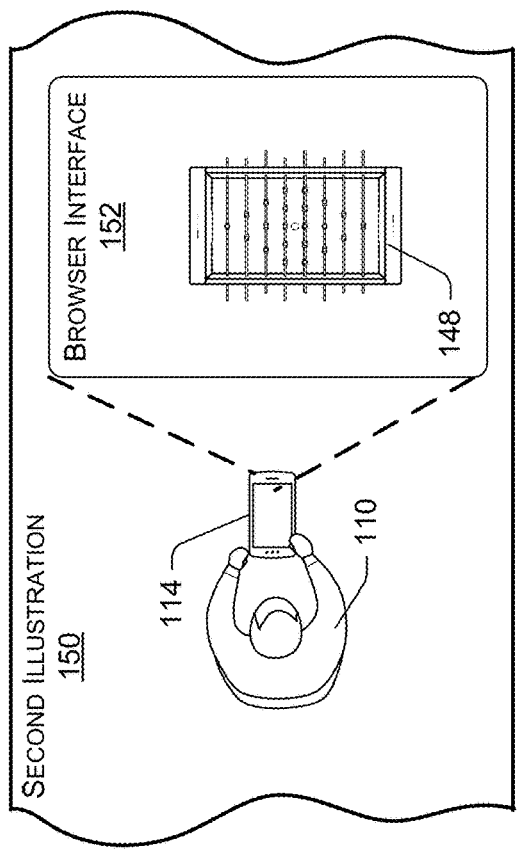
Figure 1B:
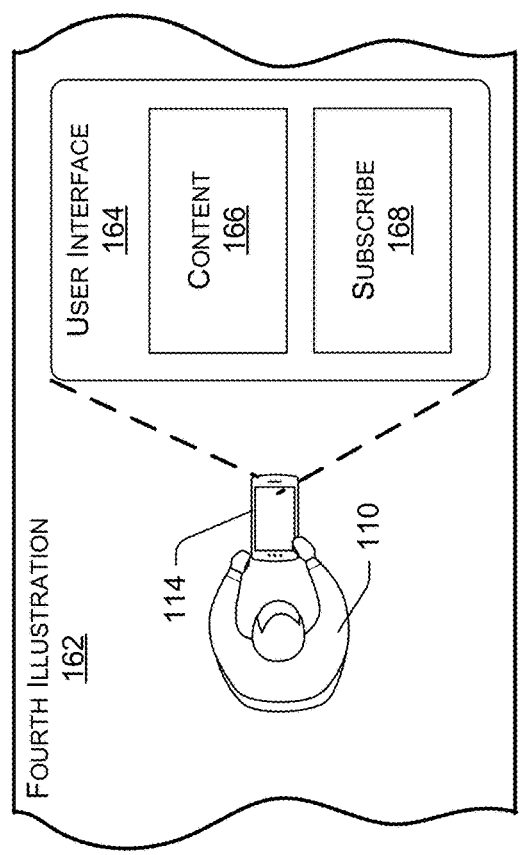
Figure 1B:
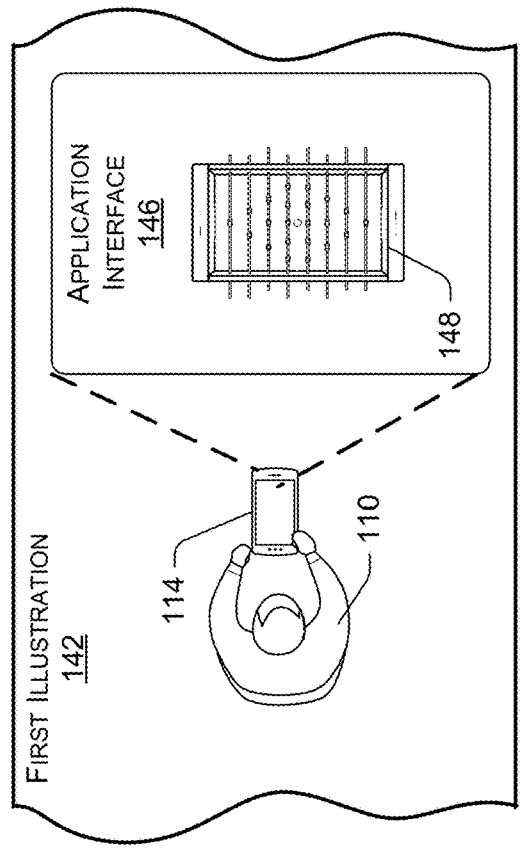
Figure 1B:
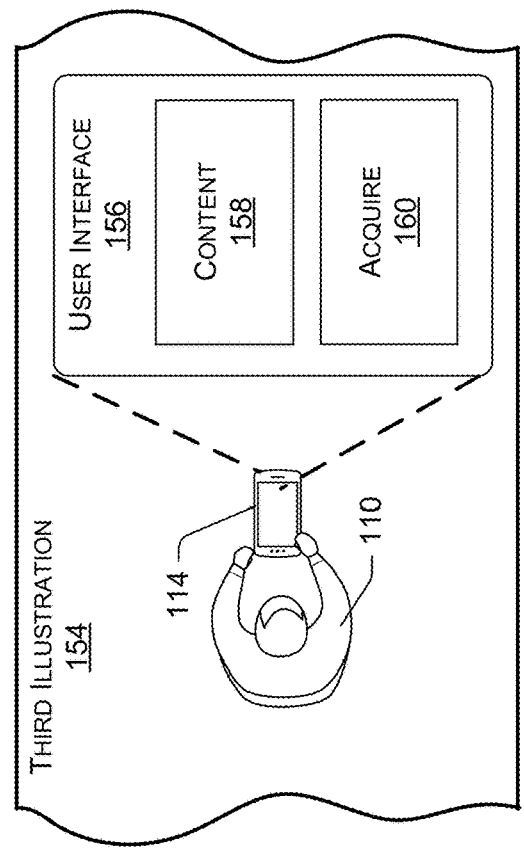

FIGS. 1A-1B illustrate a schematic diagram of an example system for providing a link that is associated with a network application, in accordance with examples of the present disclosure. The system 100 may include, for example, remote system(s) 102, a source 104 (e.g., a user, a developer, an associate associated with a third-party service, etc.) located in a first environment 106, a first electronic device 108, a user 110 located in a second environment 112, and a second electronic device 114. In the example of FIGS. 1A-1B, the first electronic device 108 and the second electronic device 114 may communicate with the remote system(s) 102 via network(s) 116.

In the example of FIG. 1A, the source 104 may include a user that wants to share a link 118 associated with a network application with at least the user 110. To share the link 118, the first electronic device 108 may receive, from the source 104, one or more inputs representing credentials associated an account associated with the source 104. For example, the credentials may be for logging into the account associated with the source 104. The remote system(s) 102 may then receive, from the first electronic device 108, input data 120 representing the one or more inputs. Using the input data 120, the remote system(s) 102 may identify the account associated with the source 104. For example, the remote system(s) 102 may match the credential represented by the input data 120 with additionally credentials represented by account data 122, where the account data 122 represents at least the account associated with the source 104. Based on the match, the remote system(s) 102 may identify the account associated with the source 104.

The source 104 may then select a network application for generating the link 118. For example, the first electronic device 108 may display a list of network applications that may be accessed by the source 104. While displaying the list, the first electronic device 108 may receive, from the source 104, an input selecting the network application. The first electronic device 108 may then send, to the remote system(s) 102, input data 120 representing the input and/or identifier data 124 representing an identifier associated with the network application. Using the input data 120 and/or the identifier data 124, the remote system(s) 102 may identify the network application. For example, the remote system(s) 102 may match the identifier represented by the identifier data 124 to an additional identifier represented by application data 126, where the application data 126 represents the network applications that are provided by the remote system(s) 102. Based on the match, the remote system(s) 102 may identify the network application.

In some examples, the remote system(s) 102 may further receive, from the first electronic device 108, request data 128 representing a request for the link 118. Based on identifying the network application and/or receiving the request data 128, the remote system(s) 102 may then generate user interface data 130 representing a user interface 132 that provides the link 118 to the source 104. For instance, the remote system(s) 102 may generate the link 118 using a page service and/or a consumer service. In some examples, the remote system(s) 102 generate the link 118 using one or more parameters, which are represented by parameter data 134. As described above, the one or more parameters may include, but are not limited to, an identifier associated with a distributer of the network application, an identifier associated with the network application, an identifier associated with a developer of the network application, an indication of the product stage associated with the network application (e.g., alpha stage, production stage, etc.), an indicator of a target client type (e.g., browser, native application, etc.), an indication to redirect to a specific target client type, and/or one or more other parameters.

The remote system(s) 102 may also generate the user interface 132 using at least the page service. The user interface 132 may include at least content 136 describing the network application and the link 118. In some examples, the user interface 132 includes plaintext that provides the link 118 to the source 104. In other examples, the user interface 132 includes the link 118 embedded in an interface element, where the source 104 is able to select the interface element in order to retrieve the link 118. In either example, the remote system(s) 102 may send the user interface data 130 to the first electronic device 108. The first electronic device 108 may then use the user interface data 130 to display the user interface 132 to the source 104.

The source 104 may then use the user interface 132 to share the link 118 with the user 110. In some example, the source 104 may share the link 118 by using the first electronic device 108 to send, to the second electronic device 114, a message that includes the link 118. For a second example, the source 104 may share the link 118 by using the first electronic device 108 to post the link 118 on a social media platform. Still, for a third example, the source 104 may share the link 118 by using the first electronic device 108 to post the link 118 to another type of website. In either of these examples, a resource 138 being displayed by the second electronic device 114 may include the message, a page provided by the social media platform, and/or the other type of website. Additionally, while these are just a couple example techniques of how the source 104 may share the link 118 with the user 110, in other examples, the source 104 may use one or more additional and/or alternative techniques for sharing the link 118.

As shown, the resource 138 includes at least an interface element 140 with the link 118 embedded in the interface element 140. In some examples, the interface element 140 may include content created by the source 104 and/or the remote system(s) 102. In some examples, the interface element 140 may include content describing at least the network application and an action associated with the link 118. For example, if the network application includes a network game and the link 118 is associated with starting a new session of the network game, then the interface element 140 may identify the network game and include text stating "Play Now". This way, the user 110 is able to identify both the network application associated with the interface element 140 along with the action that will occur by selecting the interface element 140. While this is just one example of content that may be provided with the interface element 140, in other example, additional and/or alternative content may be provided with the interface element 140.

In the example of FIG. 1A, the user 110 may select the interface element 140. For example, while displaying the resource 138, the second electronic device 114 may receive, from the user 110, an input selecting the interface element 140. In some examples, based on the input, the second electronic device 114 may send data to the remote system(s) 102. For a first example, the second electronic device 114 may send, to the remote system(s) 102, identifier data 124 representing the identifier of the network application. The remote system(s) 102 may then use the identifier data to identify the network application, using the processes above. For a second example, the second electronic device 114 may send, to the remote system(s) 102, parameter data 134 representing the one or more parameters associated with the link 118. Again, the remote system(s) 102 may identify the network application using the parameters data 134.

In some examples, the remote system(s) 102 may determine if the user 110 has an account associated with network applications. For a first example, if the user 110 is already logged into a native application associated with the account on the second electronic device 114, then the remote jsystem(s) 102 may receive, from the second electronic device 114, data that identifies the account. For example, the data may represent at least credentials associated with the account. The remote system(s) 102 may then use the data to identify the account. For a second example, if the user 110 is already logged into an account using a browser, then the remote system(s) may have already received the data from the second electronic device 114 are identify the account.

Additionally, or alternatively, in some instances, the remote system(s) 102 may determine if the user 110 is authorized to access the network application. As described herein, the remote system(s) 102 may determine that the user 110 is authorized to access the network application based on the user 110 having been provided free access to the network application, rented the application, purchased the network application, subscribed to a service that provides network applications, and/or the like. In some examples, the remote system(s) 102 use the account associated with the user 110 to determine if the user 110 has acquired the network application. For example, the account may indicate when the user 110 has been given free access to the network application, rented the network application, purchased the network application, and/or subscribed to the service that provides the network applications.

The second electronic device 114 and/or the remote system(s) 102 may then perform one or more actions based on whether the user 110 has an account associated with network application, whether the user 110 is authorized to access the network application, and/or whether the second electronic device 114 has downloaded and stored a native application associated with the network applications. For instance, FIG. 1B illustrates four different actions that the remote system(s) 102 and/or second electronic device 114 may perform. While the example of FIG. 1B illustrates four different actions that the remote system(s) 102 and/or the second electronic device 114 may perform, in other examples, the remote system(s) 102 and/or the second electronic device 114 may perform additional and/or alternative actions.

For a first example, and as shown in a first illustration 142, the second electronic device 114 may have already downloaded the native application associated with the network application. Additionally, the remote system(s) 102 may have determined that the user 110 has an account and/or is authorized to access the network application. As such, the remote system(s) 102 may cause a session associated with the network application to be created for the user 110. In some examples, the remote system(s) 102 cause the session to be created using a session service. The remote system(s) 102 may then send, to the second electronic device 114, session data 144 associated with the session. For instance, the session data 144 may represent at least an identifier associated with the session, an address of a host (e.g., one or more computers) of the session, and/or the like.

In this example, the link 118 may be associated with a particular point within the network application. For instance, if the network application includes a network game, such as a soccer game, then the link 118 may be associated with a particular period (e.g., the second half) of the soccer game. As such, the second electronic device 114 may use the data to join the session and at the particular point within the network application. Additionally, or alternatively, in this example, the link 118 may be associated with a limited period of time. As such, the electronic device 114 may only be able to access the session for the limited period of time.

The second electronic device 114 may then open the native application, if the native application is not already open on the second electronic device 114, which is illustrated by an application interface 146. Additionally, the second electronic device 114 may use the session data 144 to connect to the session for the network application. For instance, and as illustrated in the example of FIG. 1B, the second electronic device 114 is displaying content 148 related to the session of the network application. In the example of FIG. 1B, the network application may include a foosball game. However, in other examples, the network application may include any other type of application.

For a second example, and as shown in a second illustration 150, the second electronic device 114 may not have downloaded the native application and/or the link 118 may target browsers. Additionally, the remote system(s) 102 may again have determined that the user 110 has an account and/or is authorized to access the network application. As such, the remote system(s) 102 may again cause the session associated with the network application to be created for the user 110. The remote system(s) 102 may then send, to the second electronic device 114, the session data 144 associated with the session. Using the session data 144, the second electronic device 114 may again connect to the session, but this time using the browser, which is illustrated by a browser interface 152.

For a third example, and as shown in a third illustration 154, the remote system(s) 102 may have determined that the user 110 has an account, but that the user 110 is not authorized to access the network application (e.g., the user has yet to acquire the network application). As such, the remote system(s) 102 may generate a user interface 156 that includes at least content 158 related to the network application and an interface element 160 for acquiring the network application. For example, the interface element 160 may be for receiving a free trial of the network application, renting the network application, purchasing the network application, and/or the like. Additionally, the remote system(s) 102 may then send, to the second electronic device 114, user interface data 130 representing the user interface 156. The second electronic device 114 may receive the user interface data 130 from the remote system(s) 102 and then use the user interface data 130 to display the user interface 156. While displaying the user interface 156, the user 110 may then use the user interface 156 to acquire and use the network application.

Still, for a fourth example, and as shown by a fourth illustration 162, the remote system(s) 102 may have determined that the user 110 does not have an account. As such, the remote system(s) 102 may generate a user interface 164 that includes at least content 166 related to the network application and an interface element 168 for creating the account. For example, the interface element 168 may be for inputting information, such as a username, a password, contact information, payment information, and/or the like that the remote system(s) 102 use to create the account. Additionally, the remote system(s) 102 may then send, to the second electronic device 114, user interface data 130 representing the user interface 164. The second electronic device 114 may receive the user interface data 130 from the remote system(s) 102 and then use the user interface data 130 to display the user interface 164. While displaying the user interface 164, the user 110 may then use the user interface 164 to create the account.

As shown by the example illustrations from FIG. 1B, by selecting the link 118, the remote system(s) 102 and/or the second electronic device 114 may perform one or more actions based on whether the second electronic device 114 has downloaded the native application, whether the user 110 has an account associated with the network applications, and/or whether the user is authorized to access the network application. In other words, the remote system(s) 102 may generate the link 118 such that the link 118 is able to cause the remote system(s) 102 and/or the second electronic device 114 to perform one or more of these actions. This way, the link 118 may be universal in that the link 118 will still cause an action to occur for various users that may be provided the link 118. For example, users may still use the link 118 if the users have downloaded the native application onto electronic devices, if the users have not downloaded the native application, if the users already have accounts, if the users to not have accounts, if the users are authorized to access the network application, and/or if the users are not authorized to access the network application.

Figure 2A:
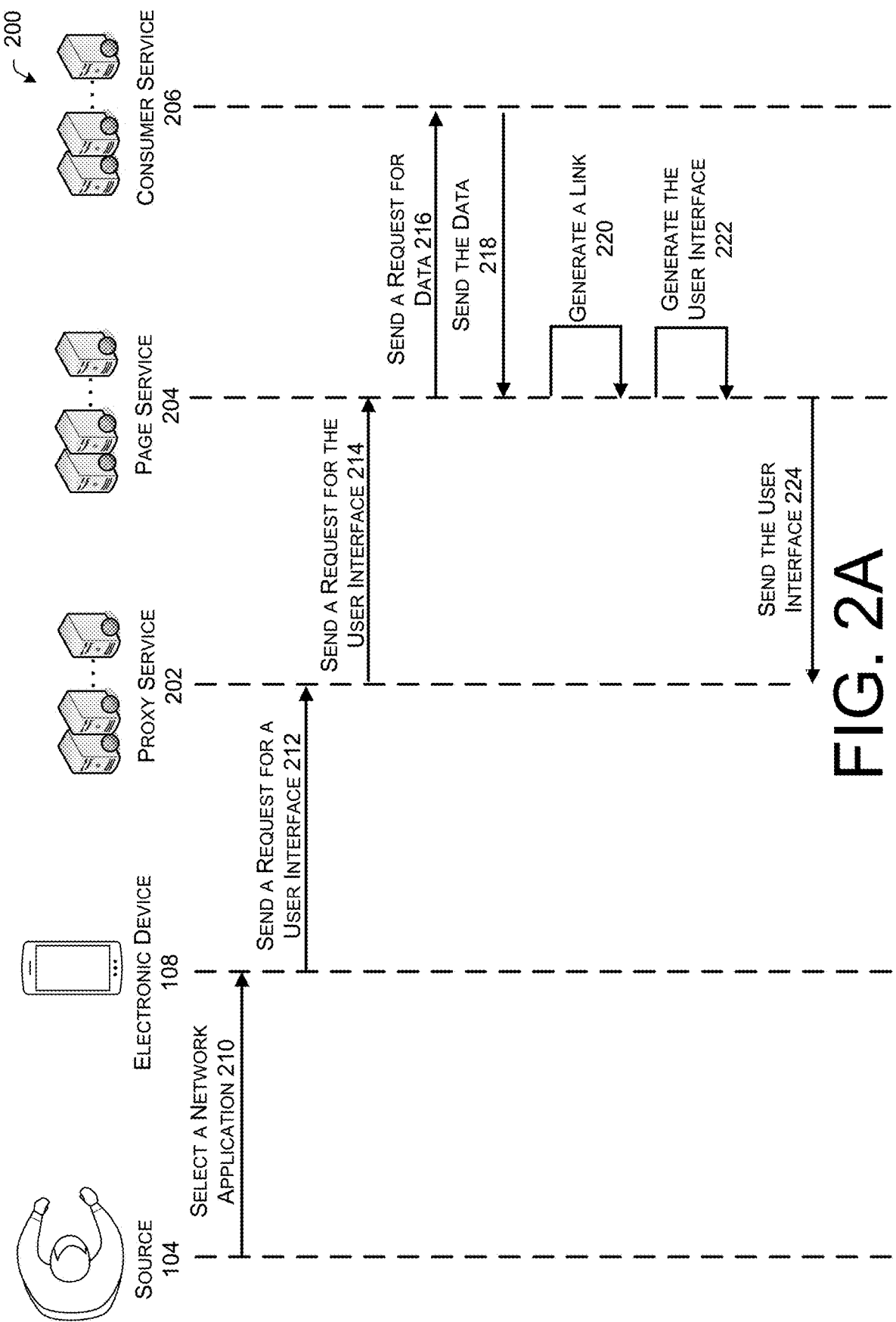
FIGS. 2A-2B illustrate a first example process for creating and sharing a link, in accordance with examples of the present disclosure.
Figure 2B:
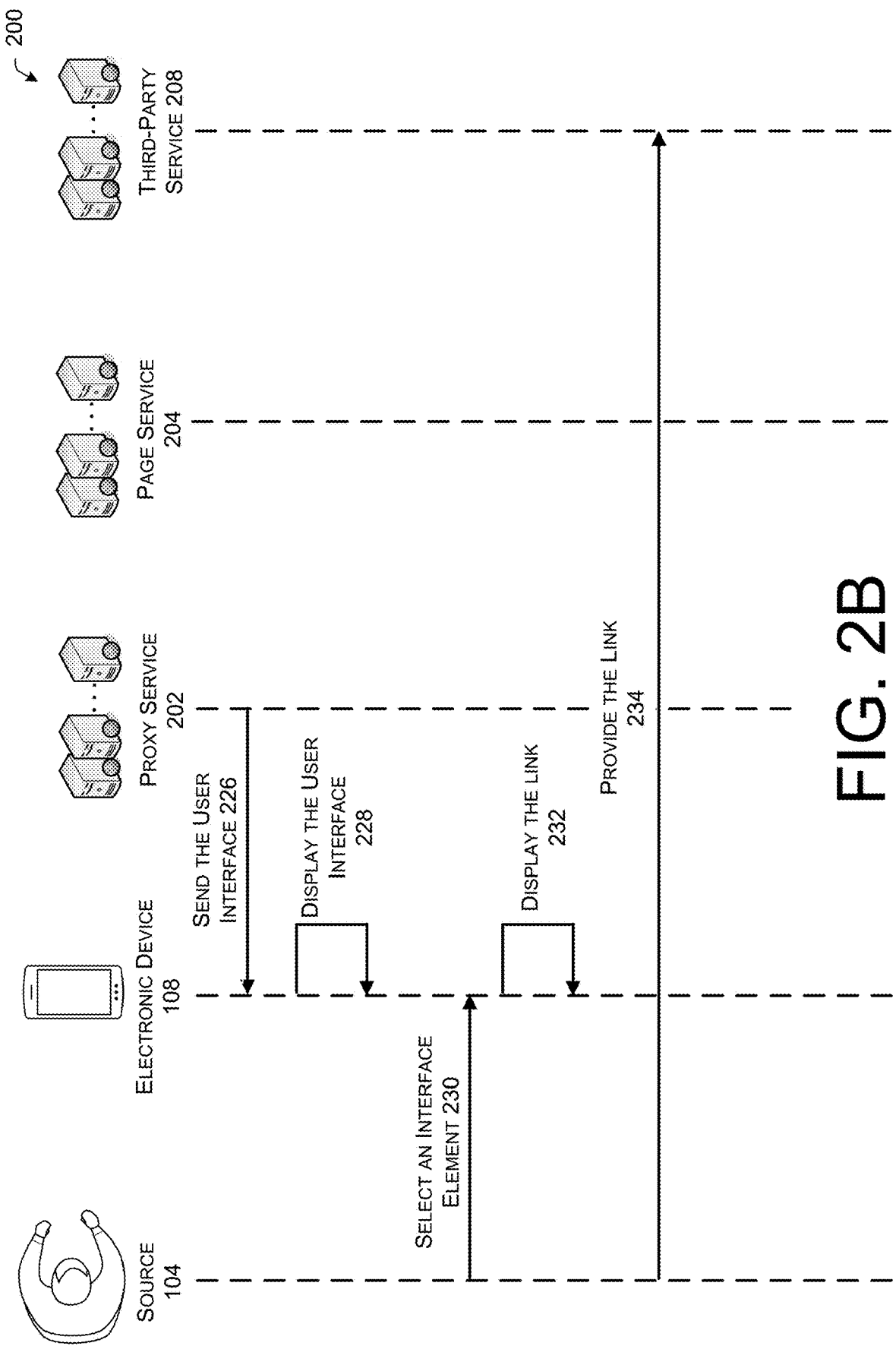

FIGS. 2A-2B illustrate a first example process 200 for creating and sharing a link, in accordance with examples of the present disclosure. In some examples, the process 200 may be associated with a user sharing the link. As shown, the process 200 is performed by the source 104, the first electronic device 108, a proxy service 202, a page service 204, a consumer service 206, and a third-party service 208. In some examples, the proxy service 202, the page service 204, the consumer service 206, and/or the third-party service 208 may be included on a single system. In other examples, the proxy service 202, the page service 204, the consumer service 206, and/or the third-party service 208 may be included on more than one system.

At 210, the source 104 may select a network application. For instance, the first electronic device 108 may display content related to network applications that the source 104 is able to select. While displaying the content, the first electronic device 108 may receive, from the source 104, an input selecting the network application. Based on the selection, and at 212, the first electronic device 108 may send, to the proxy service 202, a request for a user interface and at 214, the proxy service 202 may send, to the page service 204, a request for the user interface.

For instance, the first electronic device 108 may send first request data 128 to the proxy service 202, where the first request data 128 represents at least an identifier associated with the network application and the request for the user interface. In some examples, the first request data 128 may further represent one or more parameters associated with the network application. Next, the proxy service 202 may send second request data 128 to the page service 204, where the second request data 128 represents at least the identifier associated with the network application and the request for the user interface. In some examples, the second request data 128 may further represent the one or more parameters associated with the network application. In some examples, the second request data 128 may include the first request data 128. For example, the proxy service 202 may relay the first request data 128 to the page service 204.

At 216, the page service 204 may send, to the consumer service 206, a request for data and at 218, the consumer service 206 may send the data to the page service 204. For instance, based on receiving the second request data 128, the page service 204 may send third request data 128 to the consumer service 206. The third request data 128 may represent at least the identifier associated with the network application and the request for the data. In some instances, the page service 204 sending the third request data 128 may correspond to the page service 204 hydrating the data. Based on receiving the third request data 128, the consumer service 206 may then send the data to the page service 204. In some examples, the data may be used to generate a user interface and/or a link.

For example, at 220, the page service 204 may generate a link and at 222, the page service 204 may generate the user interface. For instance, the page service 204 may use the data to generate the link. As described herein, the page service 204 may generate the link using one or more parameters associated with the network application. The page service 204 may also generate the user interface that includes the link. In some examples, the user interface includes content related to the network application and the link embedded in an interface element. In some examples, the user interface corresponds to a details page associated with the network application.

At 224, the page service 204 may send the user interface to the proxy service 202 and at 226, the proxy service 202 may send the user interface to the first electronic device 108. For instance, the page service 204 may send, to the proxy service 202, user interface data 130 representing the user interface. The proxy service 202 may then send the user interface data 130 to the first electronic device 108. Based on receiving the user interface data 130, and at 228, the first electronic device 108 may display the user interface for the source 104.

At 230, the source 104 may select an interface element and at 232, the first electronic device 108 may display the link. For instance, while displaying the user interface, the first electronic device 108 may receive, from the source 104, the input selecting the interface element associated with the link. Based on the input, the first electronic device 108 may display the link to the source. At 234, the source 104 may then provide the link to a third-party service. For instance, and in the example of FIG. 2B, the source 104 may post the link to a social media resource (e.g., a homepage) associated with a social media platform (e.g., the third-party service 208). However, in other examples, the source 104 may use one or more additional and/or alternative techniques to provide the link.

Figure 3A:
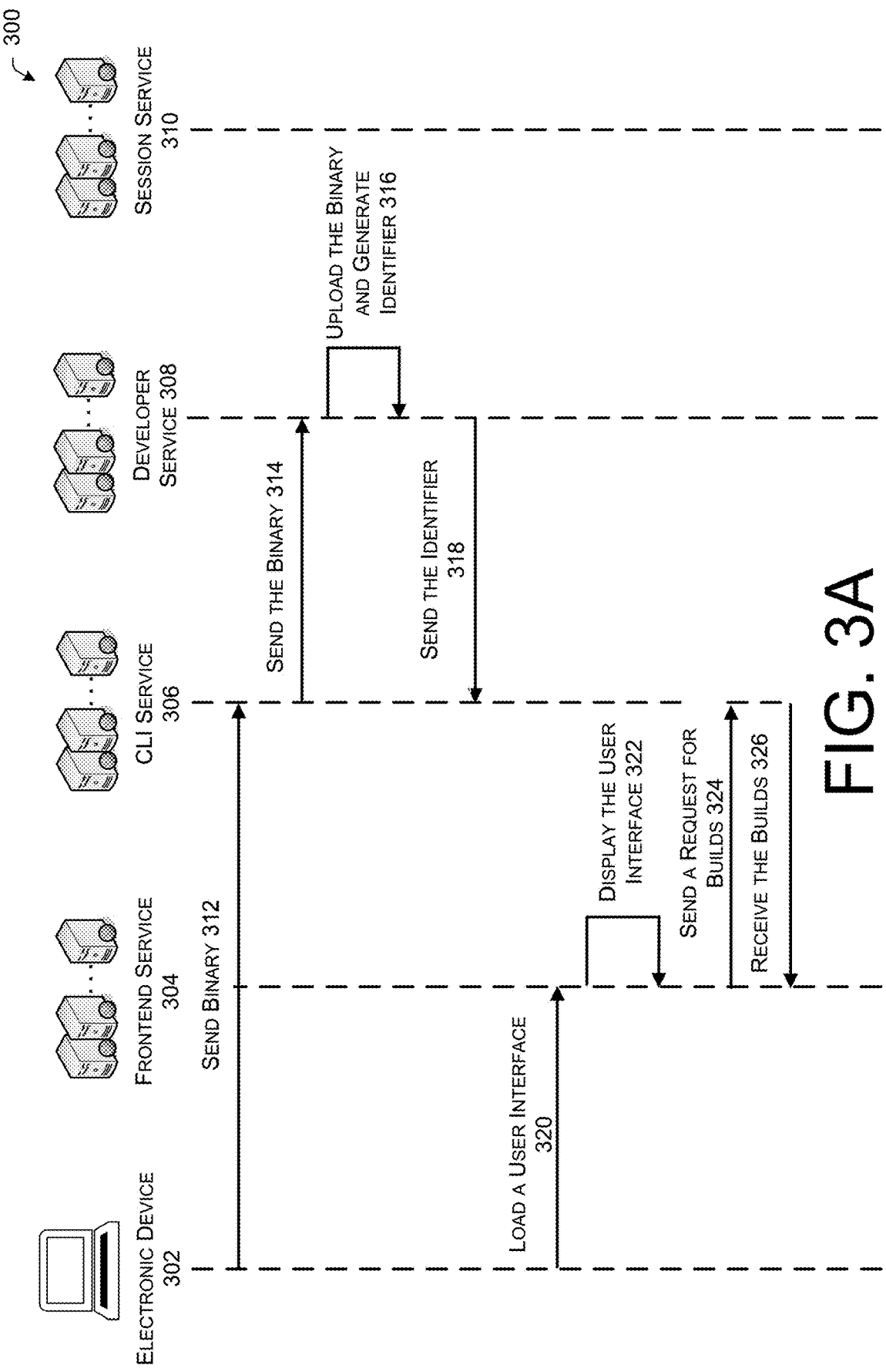
FIGS. 3A-3B illustrate a second example process for creating and sharing a link, in accordance with examples of the present disclosure.
Figure 3B:
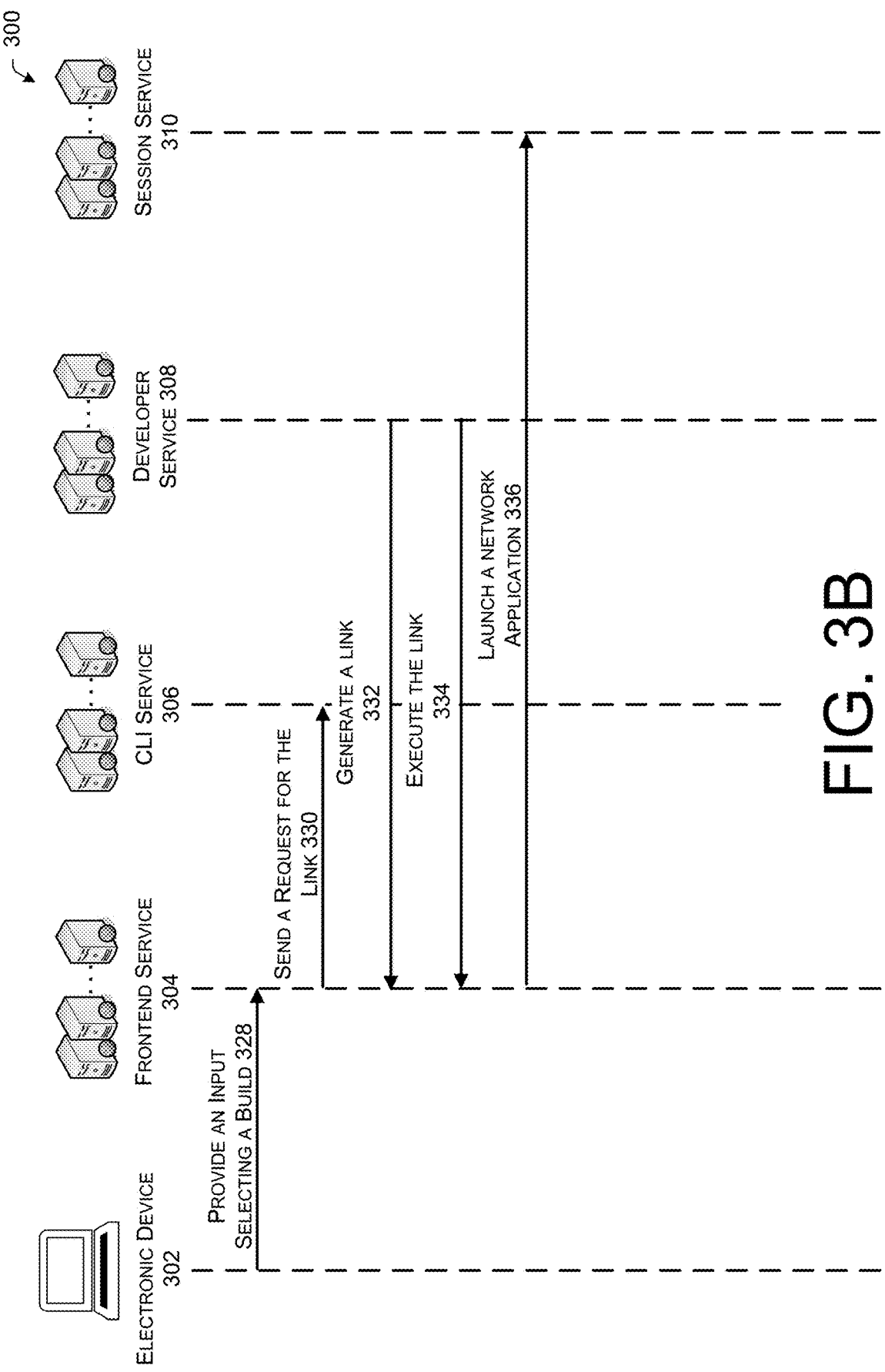

FIGS. 3A-3B illustrate a second example process 300 for creating and sharing a link, in accordance with examples of the present disclosure. In some examples, the process 300 may be associated with a developer of the network application sharing the link. As shown, the process 300 is performed by an electronic device 302 associated with the developer, a frontend service 304, a Command Line Interface (CLI) service 306, a developer service 308, and a session service 310. In some examples, the frontend service 304, the CLI service 306, the developer service 308, and/or the session service 310 may be included on a single system. In other examples, the frontend service 304, the CLI service 306, the developer service 308, and/or the session service 310 may be included on more than one system.

At 312, the electronic device 302 may send binary to the CLI service 306 and at 314, the CLI service 306 may send the binary to the developer service 308. For instance, a developer may initially use the electronic device 302 and the CLI service 306 to create the network application. After creating the network application, the electronic device 302 may upload the binary associated with the network application to the CLI service 306 which may then upload the binary to the developer service 308. In some examples, the binary is not associated with any stage of the network application. Additionally, in some examples, the binary is not associated with a details page associated with the network application. Still in some examples, the developer uploads the binary so that the developer can provision and then access the binary using a link.

At 316, the developer service 308 may then upload the binary and generate an identifier. For instance, after uploading the binary, the developer service 308 may generate a build identity associated with the binary and/or the network application. At 318, the developer 308 may send the identifier to the CLI service 306. For instance, the developer service 308 may send the build identity to the CLI service 306. In some examples, the CLI service 306 may then send the build identity to the electronic device 302.

At 320, the electronic device 302 may send a request to load a user interface and at 322, the frontend service 304 may display the user interface. In some examples, the user interface includes a builds page where the developer is able to view various builds, such as the build identity generated at 316. For example, and at 324, the frontend service 304 may send, to the CLI service 306, a request for builds associated with the developer and at 326, the CLI service 306 may send the builds to the frontend service 304. For instance, while displaying the user interface, the frontend service 304 may send first request data 128 to the CLI service 306, where the first request data 128 represents a request for the builds. The frontend service 304 may then receive and display the builds.

At 328, the electronic device 302 may provide an input selecting a build and at 330, the frontend service 304 may send, to the CLI service 306, a request for the link. For instance, the electronic device 302 may send, to the frontend service 304, input data 120 representing the input selecting the build. Based on the input, the frontend service 304 may send, to the CLI service 306, second request data 128 that represents a request for the build. For instance, the second request data 128 may represent at least the identifier associated with the build.

At 332, the developer service 308 may send, to the frontend service 304, the link and at 334, the developer service 308 may execute the link. For instance, based on receiving the second request data 128, the developer service 308 may send the link to the frontend service 304. In some examples, the sending of the link may cause the frontend service 304 to display an interface element associated with the link. The developer service 308 may also cause an execution of the link. Based on the execution, and at 336, the frontend service 304 may launch the network application using the session service 310. For example, such as when the network application includes a network game, the frontend service 304 may cause the session service 310 to create a session for the network game.

In some examples, the link may be generated using one or more of the parameters above. For example, the developer service 308 may generate the link using at least the target client type for launching the network application. As described herein, the target client type may include, but is not limited to, the native application, the browser, and/or any other type of client type. In some examples, the developer may provide the one or more parameters for generating the link. Additionally, or alternatively, in some examples, the developer service 308 may determine one or more of the parameters for generating the link. For example, if the developer does not provide parameter(s), the developer service 308 may use default parameter(s) to generate the link.

Additionally, in some examples, the developer service 308 may only generate the link based on an instance of the network application being available. For example, the developer service 308 may send, to the session service 310, a request on whether there is an available instance. The developer service 308 may then receive, from the session service 310, an indication of whether there is an instance available. In examples where an instance must be available, the developer may allocate the instances for the network application.

Figure 4C:
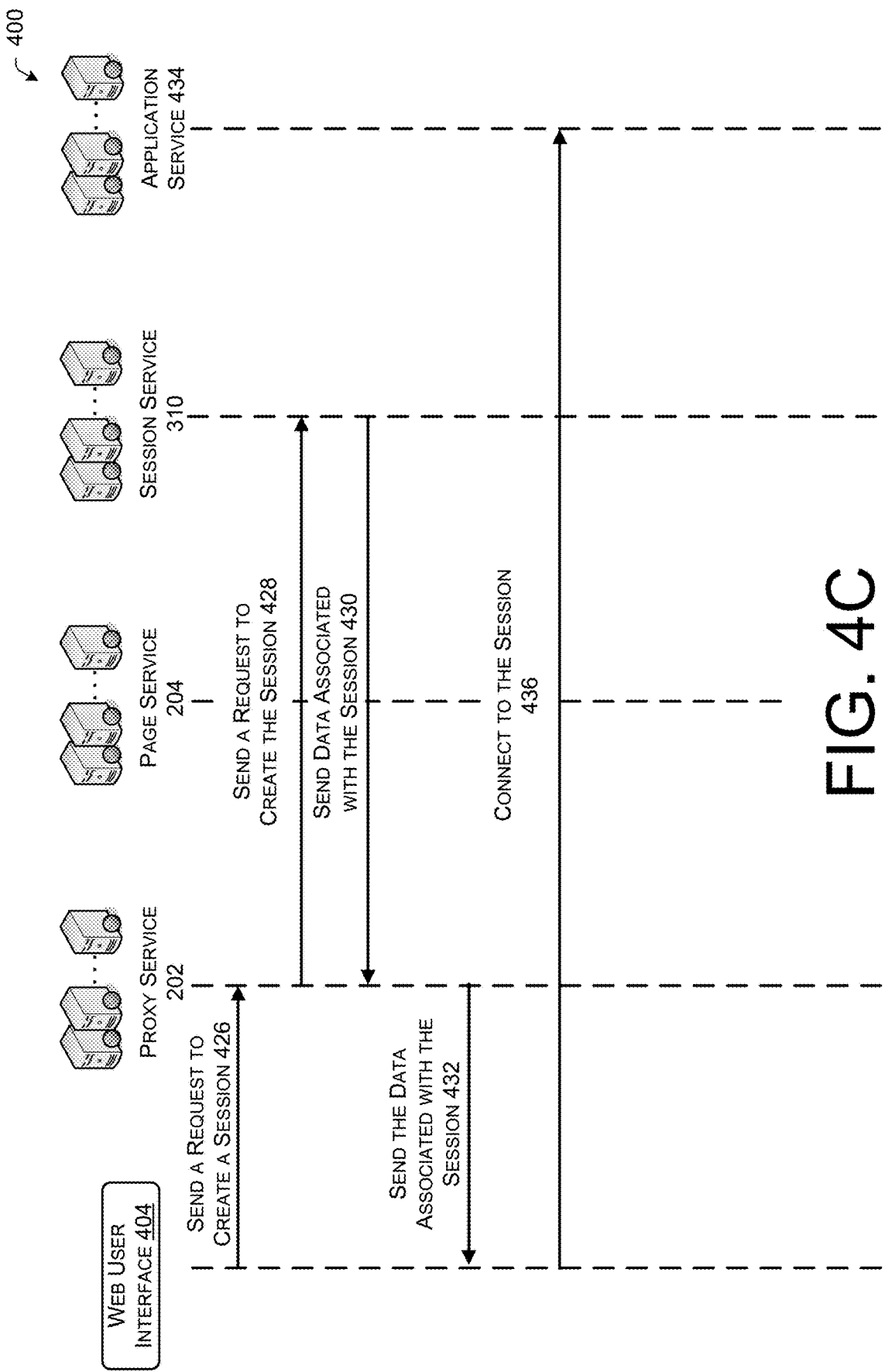

FIGS. 4A-4C illustrate an example process 400 for creating a session for a network application based on selection of a link, in accordance with examples of the present disclosure. As shown, the process 400 may be performed by a web application 402, a web user interface 404, and a native application 406. On some examples, each of the web application 402, the web user interface 404, and the native application 406 may be executing on the second electronic device 114. However, in other examples, the web application 402, the web user interface 404, and/or the native application 406 may be executing on more than one electronic device.

At 408, the web application 402 may launch a custom protocol. In some examples, the web application 402 launches the custom protocol in response to a selection of a link. In some examples, the web application 402 launches the custom protocol using the native application 406 based on the second electronic device 114 having downloaded and stored the native application 406.

At 410, the native application 406 may cause a signing in. For instance, if the user 110 is not already signed into the native application 406, then the native application 406 may cause the signing in. In some examples, the user 110 signs into the native application 406 using credentials, such as a username and password. However, in other examples, the user 110 may sign into the native application 406 using one or more additional and/or alternative techniques, such as biometric information.

At 412, the native application 406 may load a user interface using the web user interface 404. In some examples, the native application 406 may further emit a link event. At 414, the web user interface 404 may execute a link. For instance, the web user interface 404 may execute the link that is embedded in the user interface.

At 416, the web user interface 404 may send, to the proxy service 202, a request for a user interface and at 418, the proxy service 202 may send, to the page service 204, a request for the user interface. For instance, based on executing the link, the web user interface 404 may send first request data 128 to the proxy service 202, where the first request data 128 represents the request for the user interface. In some examples, the first request data 128 may further represent one or more parameters associated with the link (e.g., the identifier associated with the network application, the indication of the product stage, etc.). The proxy service 202 may then send second request data 128 to the session service 310, where the second request data 128 represents the request for the user interface. In some examples, the second request data 128 may further represent one or more parameters associated with the link (e.g., the identifier associated with the network application, the indication of the product stage, etc.). In some examples, the second request data 128 may include the first request data 128 (e.g., the proxy service 202 relays the first request data 128 from the web user interface 404).

At 420, the page service 204 may send the user interface to the proxy service 202 and at 422, the proxy service 202 may send the user interface to the web user interface 404. For instance, the page service 204 may generate the user interface. In some examples, the user interface is a details page that includes content related to the network application. In some examples, the details page may further include an interface element for accessing the network application (e.g., for starting the network application). The page service 204 may then send, to the proxy service 202, user interface data 130 representing the user interface. Based on receiving the user interface data 130, the proxy service 202 may send the user interface data 130 to the web user interface 404.

At 424, the web user interface 404 may scan the user interface for one or more actions. The one or more actions may include, but are not limited to, creating a session associated with the network application, connecting to a session associated with the network application, using a token that provides access to the network application, and/or any other type of action. If the web user interface 404 identifies an action, then the web user interface 404 may automatically execute the action.

At 426, the web user interface 404 may send, to the proxy service 202, a request to create a session and at 428, the proxy service 202 may send, to the session service 310, a request to create the session. For instance, based on identifying an action and/or receiving an input associated with the link, the web user interface 404 may send third request data 128 to the proxy service 202, where the third request data 128 represents the request to create the session. In some examples, the third request data 128 may further represent one or more parameters associated with the link (e.g., the identifier associated with the network application, the indication of the product stage, etc.). The proxy service 202 may then send fourth request data 128 to the session service 310, where the fourth request data 128 represents the request to the create the session. In some examples, the fourth request data 128 may further represent one or more parameters associated with the link (e.g., the identifier associated with the network application, the indication of the product stage, etc.). In some examples, the fourth request data 128 may include the third request data 128 (e.g., the proxy service 202 relays the third request data 128 from the web user interface 404).

At 430, the session service 310 may send, to the proxy service 202, data associated with the session and at 432, the proxy service 202 may send, to the web user interface 404, the data associated with the session. For instance, based on creating the session, the session service 310 may send the data to the proxy service 202. In some examples, the web user interface 404 and/or the proxy service 202 may continue to request the data until the data is received from the session service 310. The data may include at least an identifier associated with the session and an address associated with a host of the session (e.g., an application service 434). The proxy service 202 may then send the data to the web user interface 404. Using the data, and at 436, the web user interface 404 may connect to the session.

It should be noted that, while the example of FIGS. 4B-4C illustrate processes performed by the web user interface 404, in other examples, similar processes may be performed by the web application 402. This may occur based on whether the native application 406 is installed on the device, the platform client type indicated by the link, and/or the like.

Figure 5A:
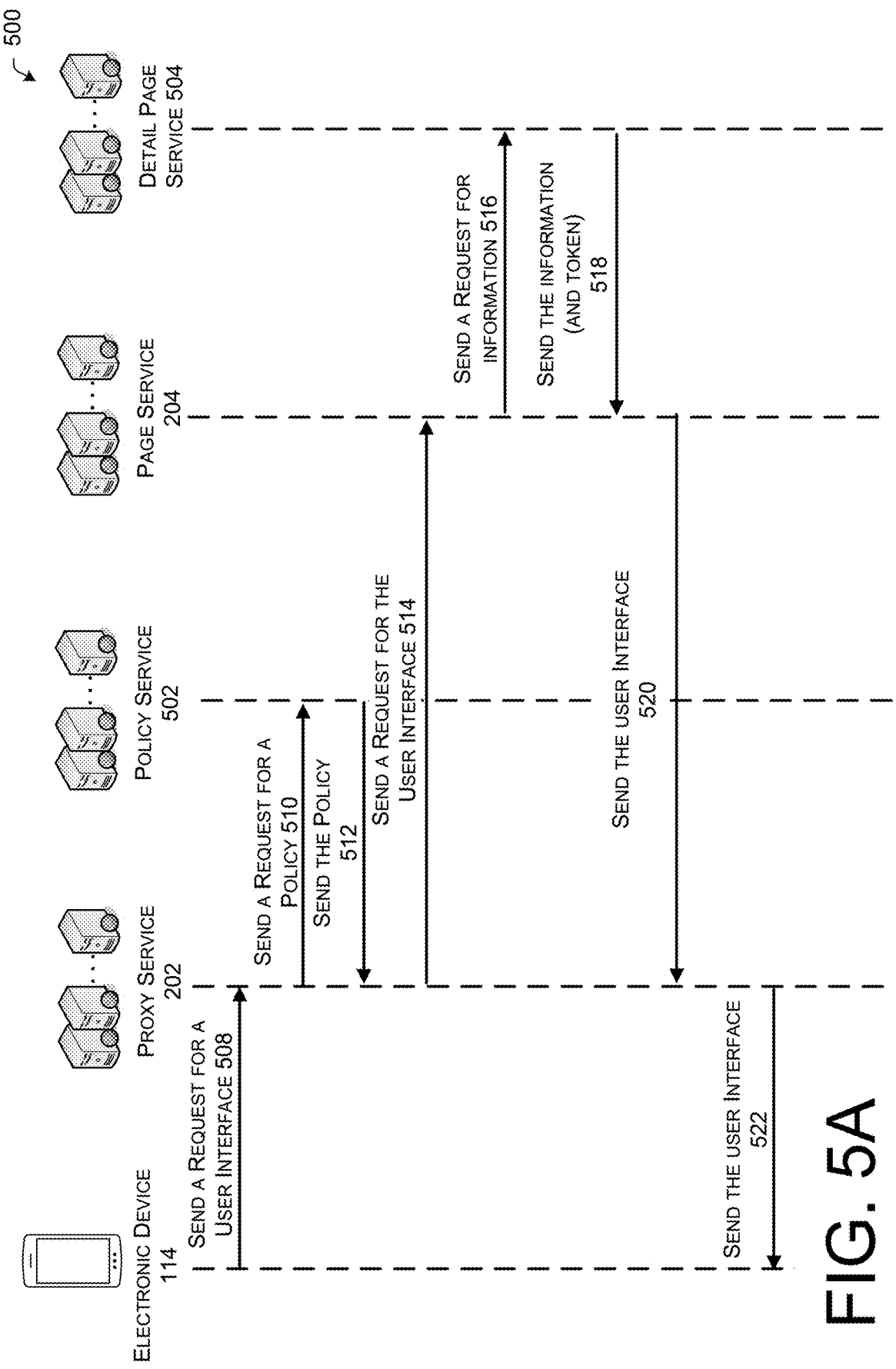
FIGS. 5A-5B illustrate an example process for provisioning a session for a network application, in accordance with examples of the present disclosure.
Figure 5B:
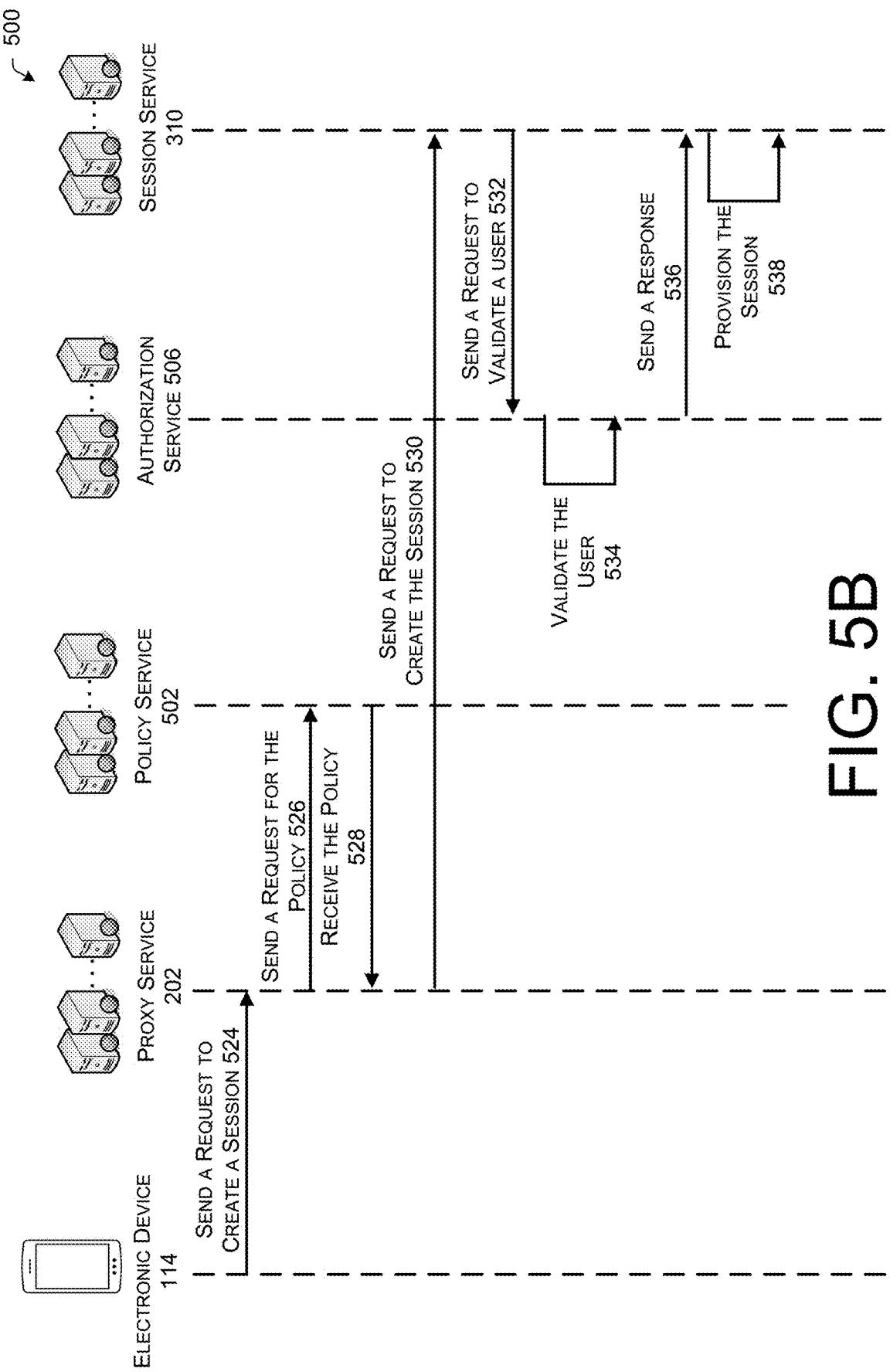

FIGS. 5A-5B illustrate an example process 500 for provisioning a session for a network application, in accordance with examples of the present disclosure. In some examples, the process 500 is performed by the second electronic device 114, the proxy service 202, the page service 204, a policy service 502, a detail page service 504, and an authorization service 506. In some examples, the proxy service 202, the page service 204, the policy service 502, the detail page service 504, and the authorization service 506 may be included on a single system. In other examples, the proxy service 202, the page service 204, the policy service 502, the detail page service 504, and the authorization service 506 may be included on more than one system.

At 508, the second electronic device 114 may send, to the proxy service 202, a request for a user interface. For instance, the second electronic device 114 may send first request data 128 to the proxy service 202, where the first request data 128 represents the request. In some example, the first request data 128 may further represent one or more parameters associated with a network application, an identifier associated with the user 110, and/or an identifier associated with the account of the user 110. In some examples, the second electronic device 114 sends the first request data 128 based on receiving, from the user 110, an input selecting a link associated with then network application.

At 510, the proxy service 202 may send, to the policy service 502, a request for a policy and at 512, the policy service 502 may send, to the proxy service 202, the policy. For instance, the proxy service 202 may send, to the policy service 502, second request data 128 representing the request for the policy. In some examples, the second request data 128 may further represent one or more of the parameters associated with the network application, the identifier associated with the user 110, and/or the identifier associated with the account of the user 110. Based on sending the second request data 128, the policy service 502 may then send policy data representing the policy and/or a policy identifier to the proxy service 202. The policy and/or the policy identifier may be associated with the user 110.

At 514, the proxy service 202 may send, to the page service 204, a request for the user interface and at 516, the page service 204 may send, to the detail page service 504, a request for information. For instance, the proxy service 202 may send third request data 128 to the page service 204, where the third request data 128 represents the request for the user interface. In some examples, the third request data 128 may further represent the one or more parameters associated with the network application, the identifier associated with the user 110, the identifier associated with the account of the user 110, and/or the policy. The page service 204 may then send fourth request data 128 to the detail page service 504, where the fourth request data 128 represents the request for information about the network application. In some examples, the fourth request data 128 may further represent the one or more parameters associated with the network application, the identifier associated with the user 110, the identifier associated with the account of the user 110, and/or the policy.

At 518, the detail page service 504 may send the information and/or a token to the page service 204 and at 520, the page service 204 may send the user interface to the proxy service 202. For instance, based on receiving the third fourth request data 128, the detail page service 504 may send the information and/or the token to the page service 204. The page service 204 may then use the information to generate the user interface. In some examples, the user interface includes a details page associated with the network application. For instance, the user interface may include at least content associated with the network application and a link to access the network application. Next, and at 522, the proxy service 202 may send the user interface data 130 to the second electronic device 114.

At 524, the second electronic device 114 may send, to the proxy service 202, a request to create a session. For instance, the second electronic device 114 may send sixth request data 128 to the proxy service 202, where the sixth request data represents the request to create the session. In some examples, the sixth request data 128 further represents the one or more parameters associated with the network application, the identifier associated with the user 110, and/or the identifier associated with the account of the user 110. In some examples, the second electronic device 114 sends the sixth request data based on receiving, from the user 110, an input selecting the link associated with the network application.

At 526, the proxy service 202 may send, to the policy service 502, a request for the policy and at 528, the policy service 502 may send, to the proxy service 202, the policy. For instance, the proxy service 202 may send, to the policy service 502, seventh request data 128 representing the request for the policy. In some examples, the seventh request data 128 may further represent one or more of the parameters associated with the network application, the identifier associated with the user 110, and/or the identifier associated with the account of the user 110. Based on sending the seventh request data 128, the policy service 502 may then send policy data representing the policy and/or the policy identifier to the proxy service 202. The policy and/or the policy identifier may be associated with the user 110.

At 530, the proxy service 202 may send, to the session service 310, a request to create the session. For instance, the proxy service 202 may send eighth request data 128 to the session service 310, where the eighth request data 128 represents the request to create the session. In some examples, the eighth request data 128 further represents the one or more parameters associated with the network application, the identifier associated with the user 110, the identifier associated with the account of the user 110, the policy, and/or a token.

At 532, the session service 310 may send, to the authorization service 506, a request to validate a user and at 534, the authorization service 506 may validate the user. For instance, the session service 310 may send ninth request data 128 to the authorization service 506, where the ninth request data 128 represents the request to validate the user 110. In some examples, the ninth request data 128 may further represent the one or more parameters associated with the network application, the identifier associated with the user 110, the identifier associated with the account of the user 110, the policy, and/or the token. The authorization service 506 may then validate the user 110. For a first example, such as if the ninth request data 128 represents the token, then authorization service 506 may validate the user 110 when the token is valid. For a second example, such as when the ninth request data 128 does not represent the token, the authorization service 506 may communicate with the policy service 502 to receive the policy specifics. The authorization service 506 may then validate the user 110 by validating the policy represented by the ninth request data 128.

At 536, the authorization service 506 may send, to the session service 310, a response. For instance, the authorization service 506 may send data representing whether the user 110 was validated. In some examples, such as when the response indicates that the authorization service 506 validated the user 110, and at 538, the session service 310 may then provision the session.

Figure 6:
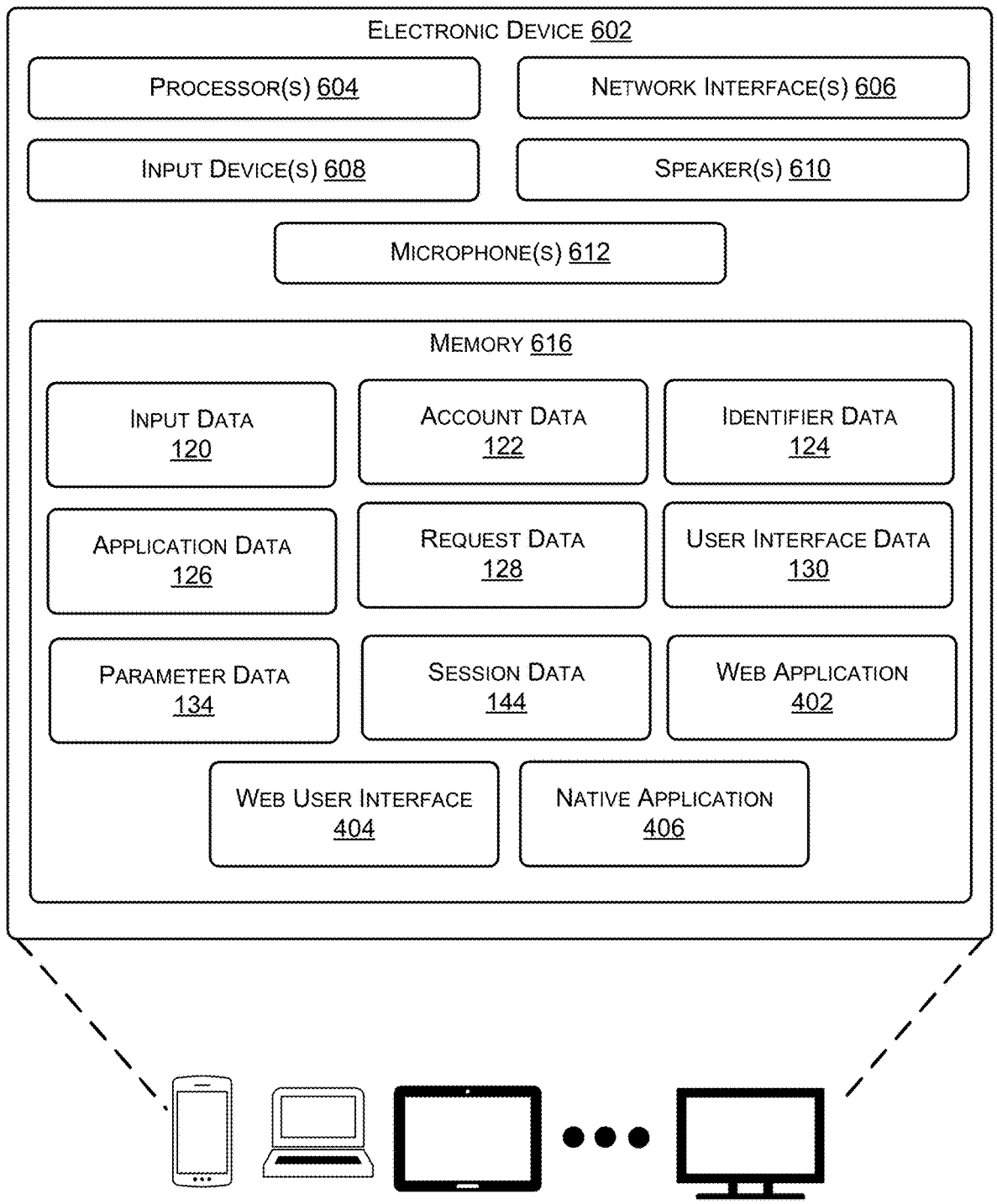
FIG. 6 illustrates a block diagram of an example architecture of an electronic device, in accordance with examples of the present disclosure.

FIG. 6 illustrates a block diagram of an example architecture of an electronic device 602, in accordance with examples of the present disclosure. In some examples, the electronic device 602 may be associated with a user, a developer, a third-party service, and/or any other source. For example, the electronic device 602 may include, and/or represent, the first electronic device 108, the second electronic device 114, and/or the electronic device 302.

As shown, the electronic device 602 may include at least one or more processors 604, one or more network interfaces 606, one or more input devices 608, one or more speakers 610, one or more microphones 612, and memory 614. However, in other examples, the electronic device 602 may include one or more additional components and/or may not include one or more of the components illustrated in the example of FIG. 6. For example, the electronic device 602 may not include the input device(s) 608, the speaker(s) 610, and/or the microphone(s) 612.

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

Network Interface(s) may enable communication of data between the remote system(s) 102, the first electronic device 108, the second electronic device 114, the proxy service 202, the page service 204, the consumer service 206, the third-party service 208, the electronic device 302, the frontend service 304, the CLI service 306, the developer service 308, the session service 310, the application service 434, the policy service 502, the detail page service 504, and/or with one or more other remote systems, as well as other networked devices. The network interface(s) may include one or more network interface controllers (NICs) or other types of transceiver devices to send and receive messages over the network(s) 116. For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 7:
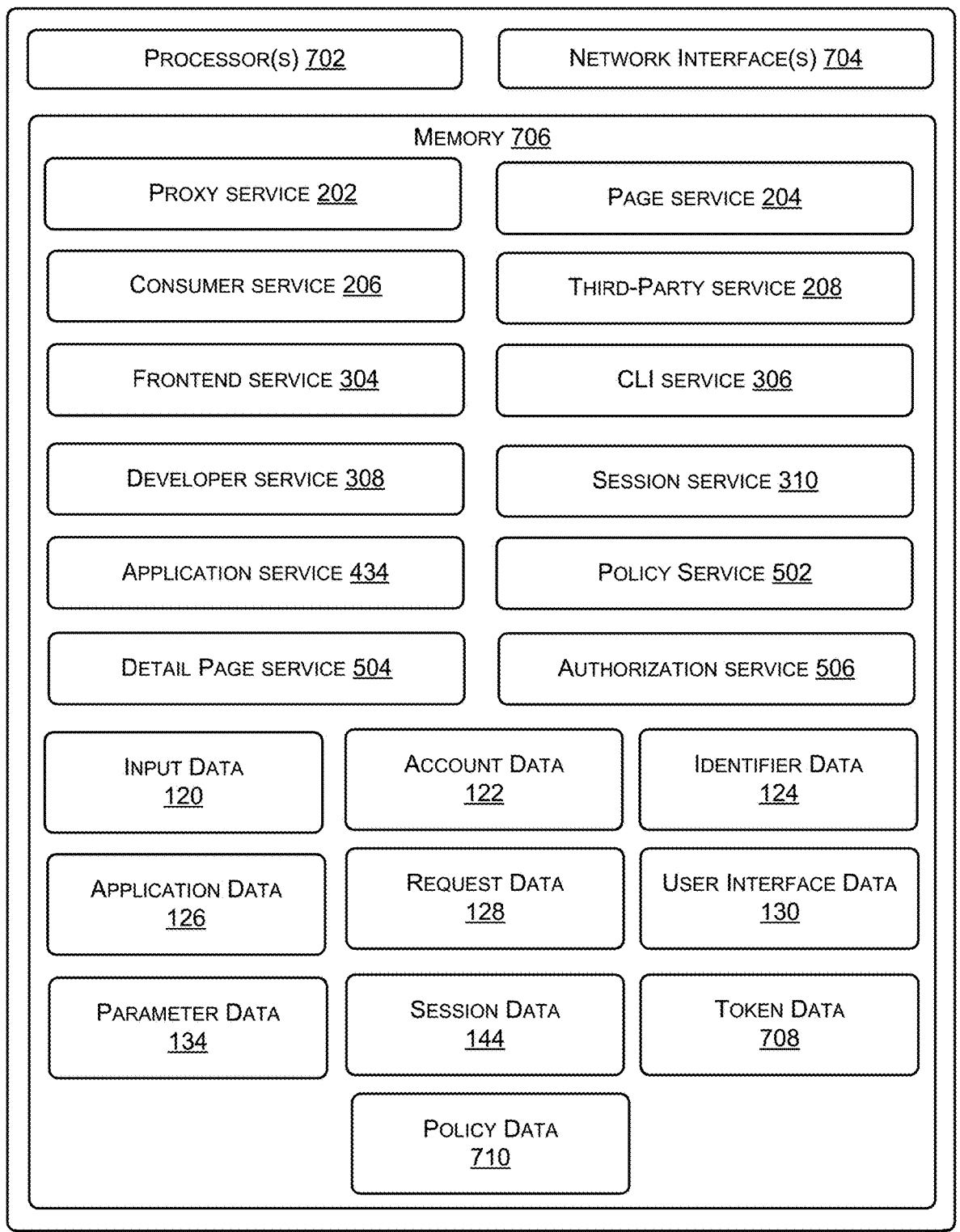
FIG. 7 illustrates a block diagram of an example architecture of remote system(s), in accordance with examples of the present disclosure.

FIG. 7 illustrates a block diagram of an example architecture of the remote system(s) 102, in accordance with examples of the present disclosure. As shown, the remote system(s) 102 include one or more processors 702, one or more network interfaces 704, and memory 706. The remote system(s) 102 may further include the proxy service 202, the page service 204, the consumer service 206, the third-party service 208, the frontend service 304, the CLI service 306, the developer service 308, the session service 310, the application service 434, the policy service 502, the detail page service 504.

In some examples, the remote system(s) 102 represent a single system that includes the proxy service 202, the page service 204, the consumer service 206, the third-party service 208, the frontend service 304, the CLI service 306, the developer service 308, the session service 310, the application service 434, the policy service 502, the detail page service 504. However, in other examples, the remote system(s) 102 represent multiple different systems that include the proxy service 202, the page service 204, the consumer service 206, the third-party service 208, the frontend service 304, the CLI service 306, the developer service 308, the session service 310, the application service 434, the policy service 502, the detail page service 504.

As further illustrated in the example of FIG. 7, the remote system(s) 102 may store token data 708. The token data 708 may indicate whether one or more network applications are accessible by users. For a first example, the token data 708 may indicate that users located within a geographic area are able to access a network application. The geographic area may include, but is not limited to, a town, a city, a state, a country, a continent, and/or any other geographic area. For a second example, the token data 708 may indicate that users within an age group are able to access a network application. In some examples, the token data 708 may be stored in association with the account data 122. For example, the token data 708 may indicate which network application(s) a user associated with an account is able to access.

The remote system(s) 102 may further store policy data 710. As described above, one or more of the services may use the policy data 710 to validate a user and/or an account of a user. In some examples, the one or more services validate the user and/or the account of the user before providing the user with access to a network application.

FIGS. 8-11 (as well as FIGS. 2A-5B) illustrate various processes for sharing links associated with network applications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 8:
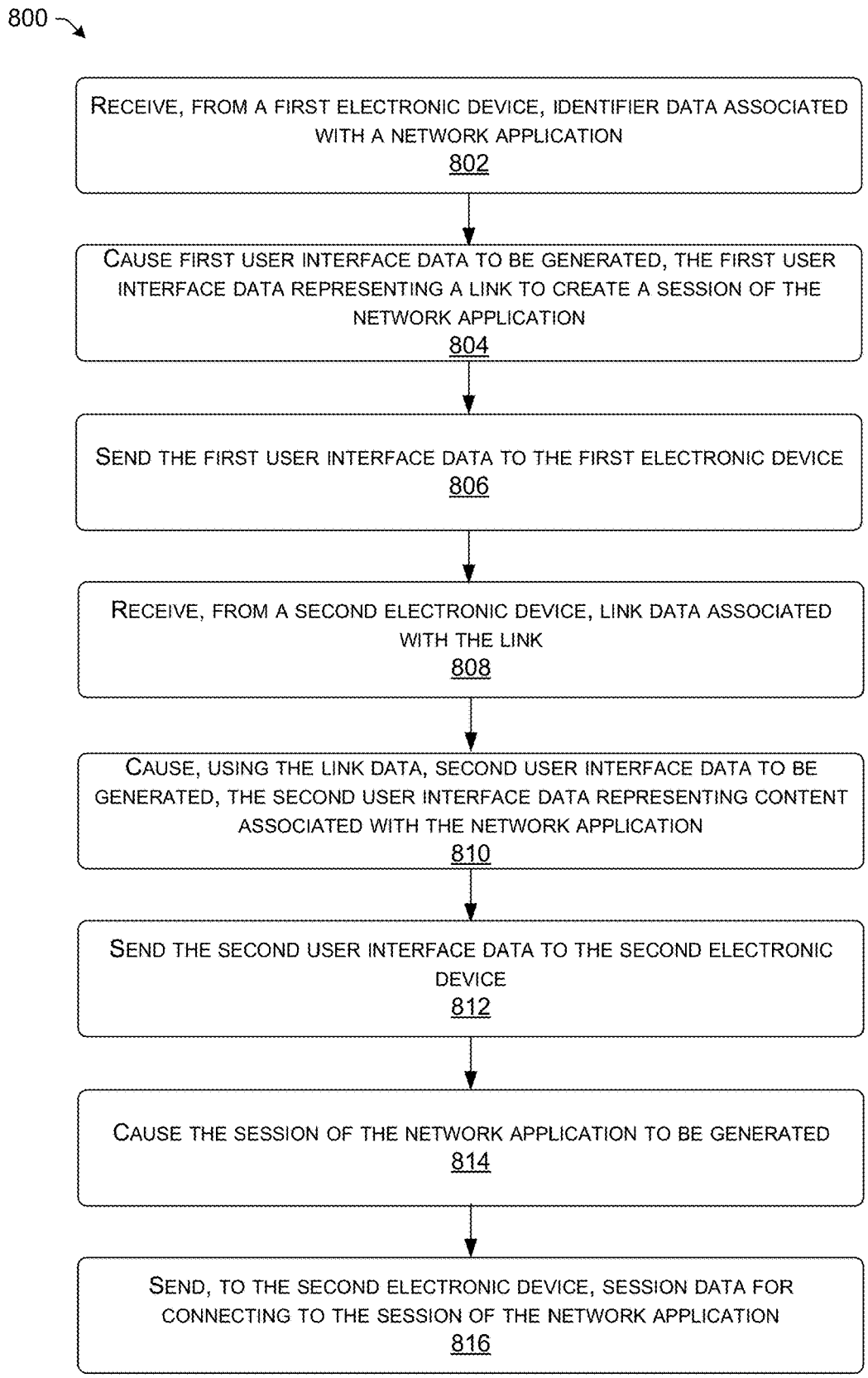
FIG. 8 illustrates an example process for providing a link to create a session for a network application and then creating the session based at least in part on a selection of the link, in accordance with examples of the present disclosure.

FIG. 8 illustrates an example process 800 for providing a link to create a session for a network application and then creating the session based at least in part on a selection of the link, in accordance with examples of the present disclosure. At 802, the process 800 may include receiving, from a first electronic device, identifier data associated with a network application. For instance, the remote system(s) 102 may receive the identifier data from the first electronic device. In some instances, the remote system(s) 102 further receive, from the first electronic device, request data representing a request for a user interface associated with the network application. In some examples, the network application includes a network game that is provided to users via network(s).

At 804, the process 800 may include causing first user interface data to be generated, the first user interface data representing at least a link to create a session of the network application. For instance, based on receiving the identifier data and/or the request data, the remote system(s) 102 may cause the link to be generated. In some examples, such as when the network application includes a network game, the link may be for creating a session of the network application. In some examples, the remote system(s) 102 cause the link to be generated using one or more parameters associated with the network application. Additionally, the remote system(s) 102 may cause the first user interface data to be generated. The first user interface data may represent a first user interface, such as a first details page, associated with the network application. For example, the first user interface may include at least content related to the network application and an interface element associated with the link.

At 806, the process 800 may include sending the first user interface to the first electronic device. For instance, the remote system(s) 102 may send the first user interface data to the first electronic device. In some examples, the first electronic device may then use the first user interface data to display the first user interface to a source (e.g., user, developer, etc.). The source may then use the first electronic device to share the link with one or more users.

At 808, the process 800 may include receiving, from a second electronic device, link data associated with the link. For instance, the remote system(s) 102 may receive the link data from the second electronic device based on a user associated with the second electronic device selecting the link. In some examples, the link data represents the one or more parameters associated with the link. In some examples, the remote system(s) 102 may then determine that the user associated with the second electronic device includes an account and/or is authorized to access the network application.

At 810, the process 800 may include causing, using the link data, second user interface data to be generated, the second user interface data representing content associated with the network application and at 812, the process 800 may include sending the second user interface data to the second electronic device. For instance, the remote system(s) 102 may cause the second user interface data to be generated. In some examples, the second user interface data may represent a second user interface, such as a second details page, that includes the content associated with the network application. The remote system(s) 102 may then send the second user interface data to the second electronic device.

At 814, the process 800 may include causing the session of the network application to be created and at 816, the process 800 may include sending, to the second electronic device, session data for connecting to the session of the network application. For instance, based on receiving the link data, the remote system(s) 102 may also cause the session of the network application to be created. In some instances, the remote system(s) 102 use a session service to create the session of the network application. The remote system(s) 102 may then send, to the second electronic device, the session data. In some instances, the session data represents at least an identifier associated with the session and an address associated with a host of the session. The second electronic device may then use the session data to connect to the session.

Figure 9:
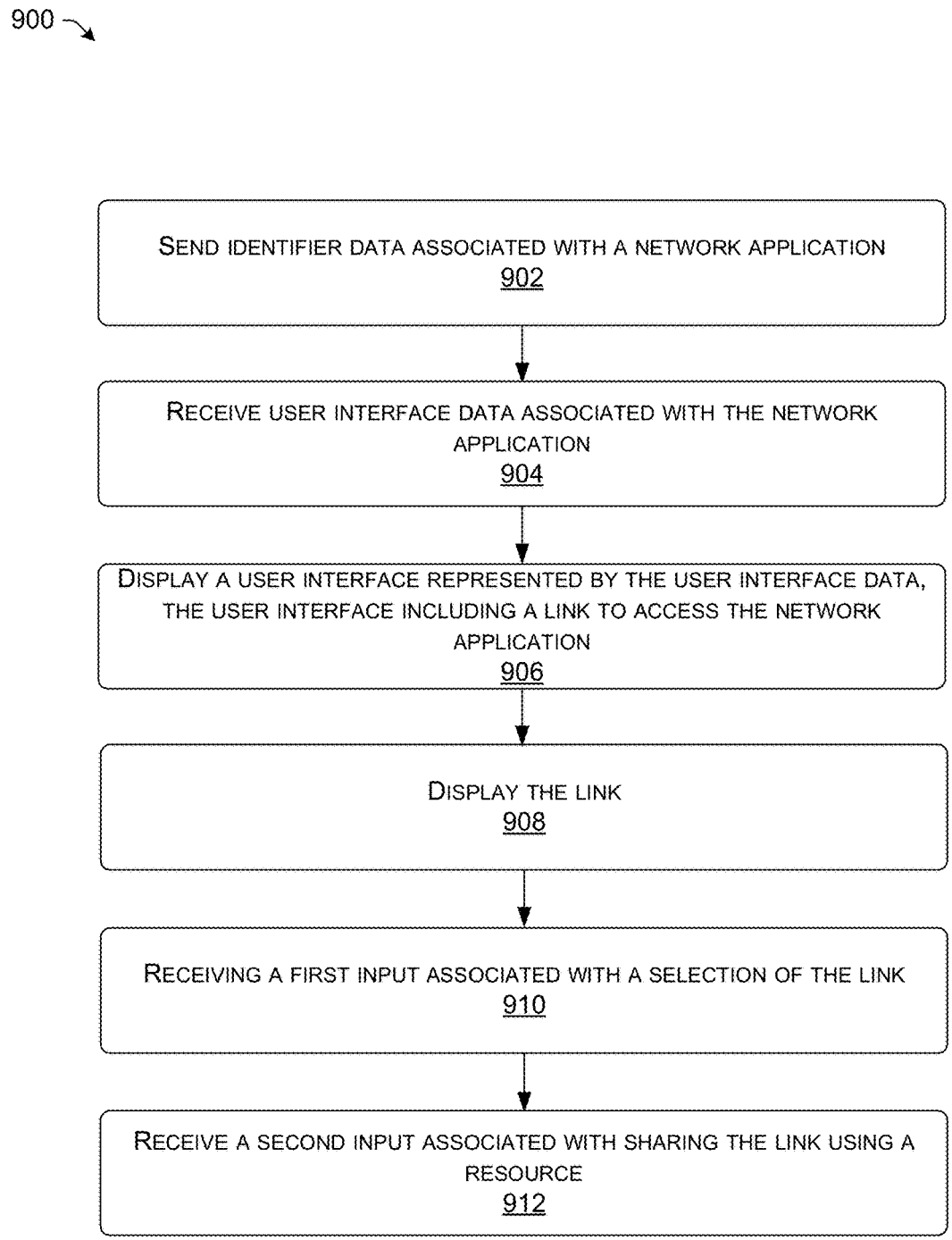
FIG. 9 illustrates an example process for sharing a link associated with a network application, in accordance with examples of the present disclosure.

FIG. 9 illustrates an example process 900 for sharing a link associated with a network application, in accordance with examples of the present disclosure. At 902, the process 900 may include sending identifier data associated with a network application. For instance, the electronic device 602 may send, to the remote system(s) 102, the identifier data associated with the network application. In some examples, the electronic device 602 sends the identifier data based on receiving, from a source, an input selecting the network application. In some examples, the electronic device 602 further sends, to the remote system(s) 102, data representing a request for a user interface (e.g., a details page) associated with the network application and/or a request for a link to access the network application.

At 904, the process 900 may include receiving user interface data associated with the network application. For instance, the electronic device 602 may receive, from the remote system(s) 102, the user interface data. Based on receiving the user interface data, and at 906, the process 900 may include displaying a user interface represented by the user interface data, the user interface including a link to access the network application. For instance, the electronic device 602 may then use the user interface data to display the user interface. The user interface, which may include a details page associated with the network application, may include content associated with the network application and the link. In some examples, the link is embedded in an interface element of the user interface.

At 908, the process 900 may include displaying the link. For instance, the electronic device 602 may display the link. In some examples, the electronic device 602 displays the link based on receiving an input selecting the interface element. For example, the electronic device 602 may display the link using another user interface, such as a popup window, based on receiving the input.

At 910, the process 900 may include receiving a first input associated with a selection of the link and at 912, the process 900 may include receiving a second input associated with sharing the link using a resource. For instance, the electronic device 602 may receive the input. In some examples, the first input may correspond to a copying of the link. The electronic device 602 may then receive the second input associated with sharing the link using the resource. The resource may include, but is not limited to, a message, a website, a resource provided by a third-party service, and/or any other type of resource that the source may use to share the link with one or more users.

Figure 10:
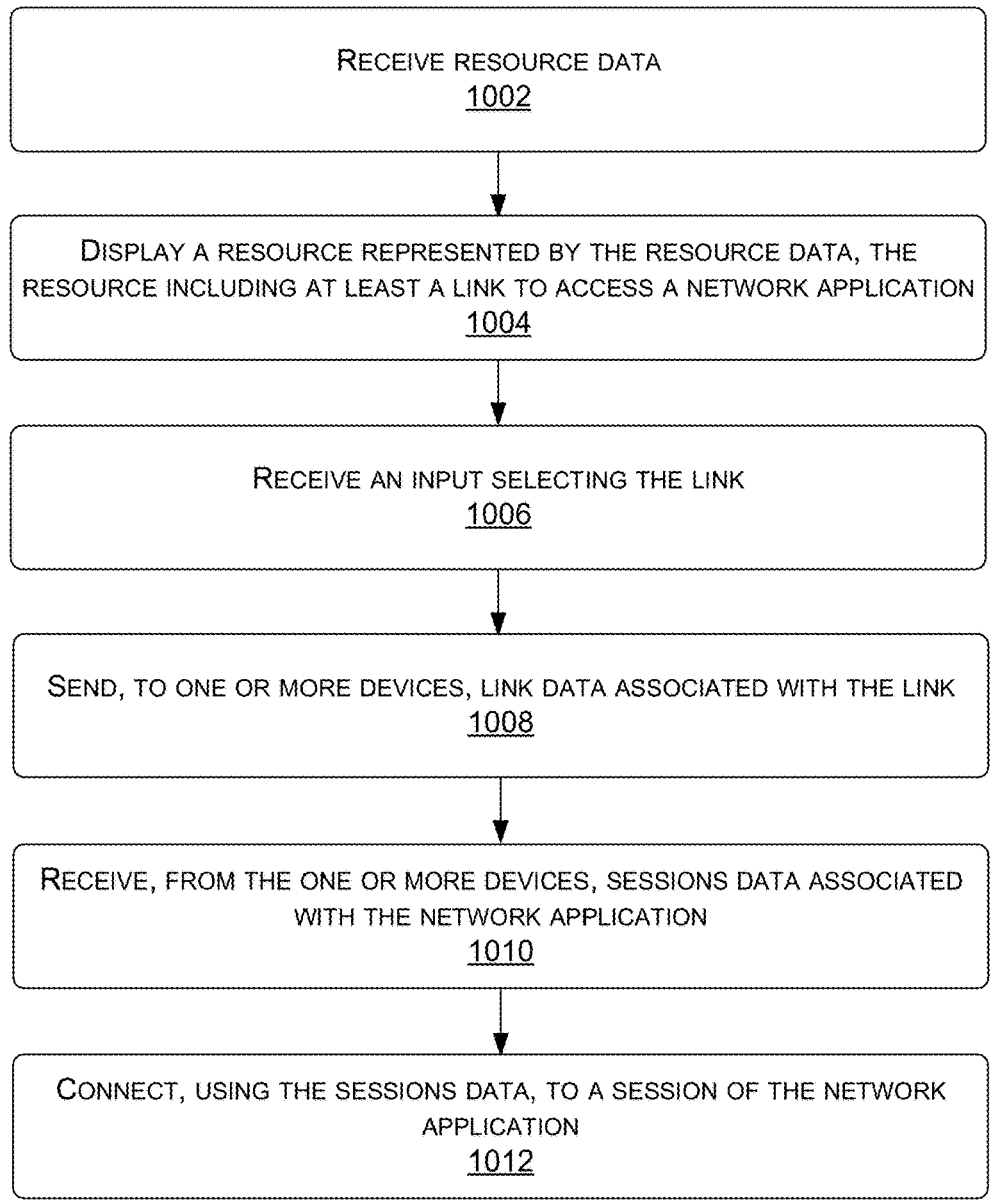
FIG. 10 illustrates an example process for accessing a network application using a link, in accordance with examples of the present disclosure.

FIG. 10 illustrates an example process 1000 for accessing a network application using a link, in accordance with examples of the present disclosure. At 1002, the process 1000 may include receiving resource data and at 1004, the process 1000 may include displaying a resource represented by the resource data, the resource including at least a link to access a network application. For instance, the electronic device 602 may receive the resource data from one or more devices. The electronic device 602 may then use the resource data to display the resource. In some examples, the link is embedded in an interface element of the resource. In some examples, the resource includes content describing the network application.

At 1006, the process 1000 may include receiving an input selecting the link and at 1008, the process 1000 may include sending, to one or more devices, link data associated with the link. For instance, while displaying the resource, the electronic device 602 may receive the input selecting the link (e.g., selecting the interface element). Based on the input, the electronic device 602 may then send the link data to the one or more devices. In some examples, the link data may represent one or more parameters associated with the link.

In some examples, based on sending the link data, the electronic device 602 may receive, from the one or more devices, user interface data. The electronic device 602 may then display a user interface represented by the user interface data. In some examples, the user interface may include a details page that includes content related to the network application.

At 1010, the process 1000 may include receiving, from the one or more devices, session data associated with the network application and at 1012, the process 1000 may include connecting, using the session data, to a session of the network application. For instance, the electronic device 602 may receive the session data from the one or more devices. The session data may represent at least an identifier associated with the session and an address associated with a host of the session. Using the session data, the electronic device 602 may then connect to the session of the network application.

Figure 11:
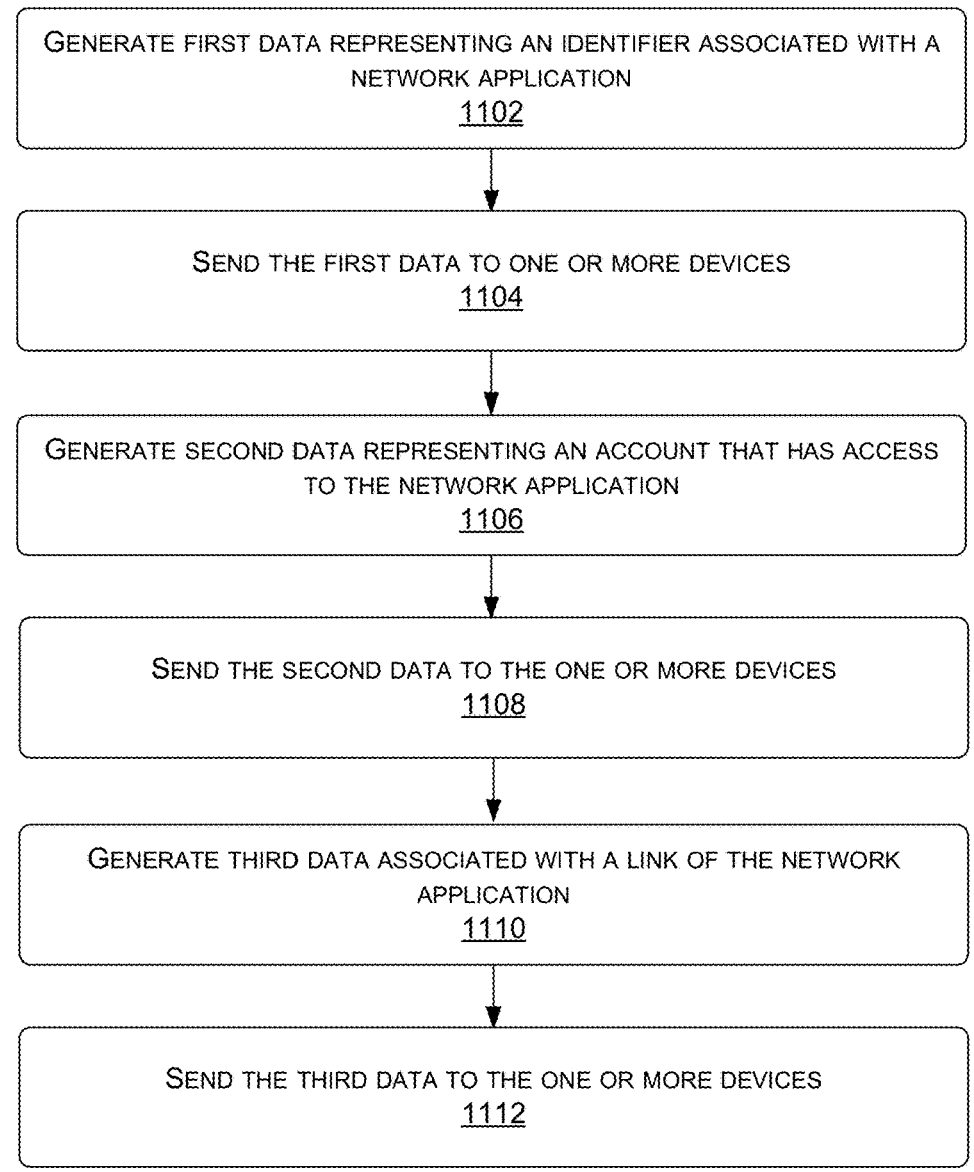
FIG. 11 illustrates an example process for providing a third-party service with data to generate and/or share a link associated with a network application, in accordance with examples of the present disclosure.

FIG. 11 illustrates an example process 1100 for providing a third-party service with data to generate and/or share a link associated with a network application, in accordance with examples of the present disclosure. At 1102, the process 1100 may include generating first data representing an identifier associated with a network application and at 1104, the process 1100 may include sending the first data to one or more devices. For instance, the remote system(s) 102 may generate the first data that represents identifier(s) of network application(s) that are active. In some examples, a network application may be activate based on users being able to access the network application and inactive based on users not being able to access the network application. The remote system(s) 102 may then send the first data to one or more devices associated with a third-party service.

At 1106, the process 1100 may include generating second data representing an account that has access to the network application and at 1108, the process 1100 may include sending the second data to the one or more devices. For instance, the remote system(s) 102 may generate the second data that represents account(s) that are authorized to access the network application. In some examples, the second data may represent identifier(s) associated with the account(s). The remote system(s) 102 may then send the second data to the one or more devices.

At 1110, the process 1100 may include generating third data associated with a link of the network application and at 1112, the process 1100 may include sending the third data to the one or more devices. For instance, the remote system(s) 102 may generate the third data. In some examples, the third data represents the link that provides access to the network application. In some examples, the third data represents a portion of the link that the third-party service then uses to generate the entire link to the network application. Still, in some examples, the third data represents a template that the third-party service may use to generate the link to the network application. In either example, the remote system(s) 102 may then send the third data to the one or more devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
one or more processors; and
one or more computer-readable media storing instructions that, when executed by the one or more processors cause the system to perform operations comprising:
receiving, from a first electronic device, a first request to generate a link associated with a media element, wherein the link is valid for a limited period of time to access the media element at a point, the first request including at least a first identifier associated with the media element;
based at least in part on receiving the first request, causing first user interface data associated with the media element to be generated, the first user interface data representing at least:
the link that can be shared, the link for creating a session for the media element at the point for the limited period of time:
sending the first user interface data to the first electronic device;
receiving, from a second electronic device and as part of a message, identifier data based at least in part on a selection of the link, the identifier data representing at least a second identifier associated with the media element;
receiving, from the second electronic device and as part of the message, target client data representing one or more parameters associated with the media element, the one or more parameters including at least a target client describing at least one of a web browser or a native application associated with the second electronic device for hosting the media element;
based at least in part on receiving the identifier data and the target client data, causing second user interface data associated with the media element to be generated by:
launching the web browser in response to the target client data indicating the web browser; and
launching the native application in response to the target client data indicating the native application, wherein in response to the native application not being installed, the native application is downloaded and installed prior to launching the native application;
sending the second user interface data to the second electronic device;
based at least in part on receiving the identifier data, causing the session for the media element to be created; and
sending, to the second electronic device, session data for connecting to the session of the media element and starting the media element at the point within the media element for the limited period of time, wherein the session data comprises target client data describing the target client.

2. The system as recited in claim 1, wherein:
the one or more parameters further including at least one of:
the second identifier associated with the media element;
a production stage associated with the media element; or
a third identifier associated with a build of the media element; and
causing the session for the media element to be created comprises causing, using the one or more parameters, the session for the media element to be created.

3. The system as recited in claim 1, wherein the media element comprises at least one of:
a video call;
a web-based chat platform;
a video entertainment program; or
an audio entertainment program.

4. A method comprising:
receiving, from one or more computing devices, first data representing a request to generate a link associated with a media element, wherein the link is valid for a limited period of time to access the media element at a point within the media element;
based at least in part on the receiving of the first data, causing the link to be generated, the link for accessing the media element at the point for the limited period of time;
sending, to the one or more computing devices, second data representing at least the link;
receiving, from an electronic device, third data associated with the link, wherein the third data comprises identifier data based at least in part on a selection of the link and target client data describing a target client of the one or more computing devices to host an instance of the media element, wherein the target client comprises at least one of a web browser or a native application;
based at least in part on receiving the third data, causing a session to be created for the media element, by:
launching the web browser in response to the target client data indicating the web browser; and
launching the native application in response to the target client data indicating the native application, wherein in response to the native application not being installed, the native application is downloaded and installed prior to launching the native application; and
sending, to the electronic device, fourth data for connecting to the session of the media element and starting the media element at the point for the limited period of time, wherein the fourth data comprises target client data describing the target client.

5. The method as recited in claim 4, further comprising:
based at least in part on receiving the first data, causing a user interface to be generated, the user interface including at least:
content associated with the media element; and
the link,
and wherein the second data represents the user interface.

6. The method as recited in claim 5, wherein causing the user interface to be generated comprises at least:
sending the first data to one or more second computing devices; and
receiving the second data from the one or more second computing devices.

7. The method as recited in claim 4, further comprising:
receiving, from the one or more computing devices, binary data associated with the media element, wherein causing the link associated with the media element to be generated comprises at least:
  based at least in part on receiving the first data and the binary data, causing an identifier associated with the media element to be generated; and
  causing the link to be generated using at least the identifier.

8. The method as recited in claim 4, wherein the media element comprises at least one of:
  a video call;
  a web-based chat platform;
  a video entertainment program; or
  an audio entertainment program.

9. The method as recited in claim 4, further comprising:
  sending, to the one or more computing devices, fifth data indicating that the media element is activate; and
  sending, to the one or more computing devices, sixth data representing one or more accounts that are able to access the media element.

10. The method as recited in claim 4, wherein the link represents at least an association between a first identifier associated with a hosting service and a second identifier associated with a third-party service.

11. The method as recited in claim 4, further comprising:
  receiving, from the one or more computing devices, fifth data representing one or more parameters associated with the media element, the one or more parameters including at least one of:
    a first identifier associated with a service that provides the media element;
    a production stage associated with the media element;
    a second identifier associated with a build of the media element; or
    a target client type for the media element;
  wherein causing the link associated with the media element to be generated comprises causing, using the one or more parameters, the link associated with the media element to be generated.

12. The method as recited in claim 4, further comprising:
  based at least in part on receiving the third data, causing a user interface to be generated, the user interface including at least content associated with the media element and configured to be displayed based on the target client data; and
  sending, to the electronic device, fifth data representing the user interface.

13. The method as recited in claim 12, wherein the content associated with the media element comprises at least one of:
  a description of the media element;
  a first interface element associated with creating an account associated with the media element; or
  a second interface element associated with acquiring the media element.

14. The method as recited in claim 4, further comprising:
  determining, based at least in part on account data, that the electronic device is authorized to access the media element,
  and wherein causing the session to be created for the media element is further based at least in part on the electronic device being authorized to access the media element.

15. The method as recited in claim 4, wherein:
  causing the session to be created for the media element comprises at least sending, to one or more second computing devices, fifth data representing at least a first identifier associated with the media element; and
  the method further comprises receiving, from the one or more second computing devices, the fourth data for connecting to the session of the media element, the fourth data representing at least a second identifier associated with the session and an address associated with a host of the session.

16. The method as recited in claim 4, wherein the second data allows the one or more computing devices to share the link with at least the electronic device.

17. A method comprising:
  sending, by an electronic device and to one or more computing devices, first data representing at least an identifier associated with a media element accessible through a network and target client data comprising at least a target client of the one or more computing devices to display an instance of the media element at the electronic device, wherein the target client comprises at least one of a web browser or a native application;
  receiving, by the electronic device and from the one or more computing devices, second data representing a user interface;
  causing, by the electronic device, the user interface to be displayed on a display, the user interface including at least content associated with the media element hosted by the target client based on the target client data, by:
    launching the web browser in response to the target client data indicating the web browser; and
    launching the native application in response to the target client data indicating the native application, wherein in response to the native application not being installed, the native application is downloaded and installed prior to launching the native application;
  receiving, by the electronic device and from the one or more computing devices, third data representing a link for creating a session for the media element, wherein the link is valid for a limited period of time to access the media element at a point within the media element;
  causing, by the electronic device, the link to be displayed on the display;
  receiving, by the electronic device, an input associated with providing the link using a network resource; and
  causing, by the electronic device, the link to be provided using the network resource.

18. The method as recited in claim 17, wherein the media element comprises at least one of:
  a video call;
  a web-based chat platform;
  a video entertainment program; or
  an audio entertainment program.

19. The method as recited in claim 17, wherein causing the link to be provided using the network resource comprises sending, by the electronic device, a message to a second electronic device, the message including at least the link.

20. The method as recited in claim 17, wherein the user interface further includes an interface element for creating the link, and wherein the method further comprises:
  receiving a third input associated with selecting the interface element; and
  sending, to the one or more computing devices, fourth data representing a request for the link,
  wherein receiving the third data representing the link is based at least in part on sending the fourth data representing the request.

* * * * *